(12) United States Patent
Isogawa et al.

(10) Patent No.: US 9,533,196 B2
(45) Date of Patent: Jan. 3, 2017

(54) GOLF BALL

(71) Applicant: DUNLOP SPORTS CO., LTD., Kobe-shi, Hyogo (JP)

(72) Inventors: Kazuhiko Isogawa, Kobe (JP); Kosuke Tachibana, Kobe (JP); Toshiyuki Tarao, Kobe (JP)

(73) Assignee: DUNLOP SPORTS CO. LTD., Kobe-shi (JP)

( * ) Notice: Subject to any disclaimer, the term of this patent is extended or adjusted under 35 U.S.C. 154(b) by 0 days.

(21) Appl. No.: 14/672,930

(22) Filed: Mar. 30, 2015

(65) Prior Publication Data

US 2015/0273276 A1   Oct. 1, 2015

(30) Foreign Application Priority Data

Mar. 31, 2014   (JP) ................................. 2014-074634
Mar. 31, 2014   (JP) ................................. 2014-074635

(51) Int. Cl.
*A63B 37/12*   (2006.01)
*A63B 37/14*   (2006.01)
(Continued)

(52) U.S. Cl.
CPC ....... *A63B 37/0075* (2013.01); *A63B 37/0022* (2013.01); *A63B 37/0033* (2013.01);
(Continued)

(58) Field of Classification Search
CPC ............ A63B 37/0022; A63B 37/0029; A63B 37/0038; C08G 18/10; C08G 18/3206; C08G 18/4854; C08G 18/6677; C08G 18/755; C08G 18/7831; C08G 18/792
See application file for complete search history.

(56) References Cited

U.S. PATENT DOCUMENTS 6,454,667 B1 *   9/2002   Iwami ................ A63B 37/0003 473/351
2003/0065124 A1 *   4/2003   Rosenberg ............. C08G 18/10 528/59

(Continued)

FOREIGN PATENT DOCUMENTS

EP   2623165 A1   8/2013
EP   2668980 A1   12/2013
(Continued)

OTHER PUBLICATIONS

Extended European Search Report dated Aug. 24, 2015, for European Application No. 15161732.1.

*Primary Examiner* — John E Simms, Jr.
(74) *Attorney, Agent, or Firm* — Birch, Stewart, Kolasch & Birch, LLP

(57) ABSTRACT

A golf ball includes an intermediate layer, a cover, and a paint film, wherein a base resin of the paint film is a polyurethane obtained by a reaction between a polyisocyanate composition and a polyol composition containing a urethane polyol including a polyether diol with a number average molecular weight ranging from 800 to 3000 as a constituent component, and the golf ball satisfies the following requirements;

$Mp \leq 200 \times X - 75$ $Mp \leq 100$ $Mm - Mc > 100$ $Tm > Tc > Tp$ $(Tm \times Mm)/(Tc \times Mc) > 7.5$ $(Tc \times Mc)/(Tp \times Mp) > 2.4.$

[Mp, Mm and Mc represent 10% modulus (kgf/cm$^2$) of the paint film, intermediate layer and cover, respectively; Tp, Tm and Tc represent thicknesses (mm) of the paint film, intermediate layer and cover, respectively; and X represents a molar ratio (NCO/OH).]

19 Claims, 2 Drawing Sheets

(51) Int. Cl.
  *A63B 37/00* (2006.01)
  *C08G 18/48* (2006.01)
  *C08G 18/66* (2006.01)
  *C08G 18/75* (2006.01)
  *C08G 18/78* (2006.01)
  *C08G 18/79* (2006.01)
  *C08G 18/10* (2006.01)
  *C09D 175/08* (2006.01)
  *C08G 18/32* (2006.01)

(52) U.S. Cl.
  CPC ...... *A63B 37/0037* (2013.01); *A63B 37/0045* (2013.01); *A63B 37/0049* (2013.01); *A63B 37/0063* (2013.01); *A63B 37/0076* (2013.01); *C08G 18/10* (2013.01); *C08G 18/3206* (2013.01); *C08G 18/4854* (2013.01); *C08G 18/6677* (2013.01); *C08G 18/755* (2013.01); *C08G 18/7831* (2013.01); *C08G 18/792* (2013.01); *C09D 175/08* (2013.01)

(56) References Cited

U.S. PATENT DOCUMENTS

| | | | | |
|---|---|---|---|---|
| 2003/0176242 A1* | 9/2003 | Mano | .................... | A63B 37/12 473/378 |
| 2005/0256237 A1* | 11/2005 | Voorheis | ................ | C08K 5/098 524/394 |
| 2006/0229143 A1* | 10/2006 | Watanabe | .......... | A63B 37/0004 473/378 |
| 2010/0167847 A1* | 7/2010 | Tarao | ................. | A63B 37/0022 473/378 |
| 2011/0053708 A1* | 3/2011 | Isoagawa | ........... | A63B 37/0022 473/376 |
| 2011/0244989 A1* | 10/2011 | Tarao | ................. | A63B 37/0022 473/385 |
| 2011/0300968 A1 | 12/2011 | Ryu et al. | | |
| 2013/0203524 A1* | 8/2013 | Tarao | ................. | A63B 37/0023 473/378 |
| 2013/0324318 A1* | 12/2013 | Isogawa | ........... | A63B 37/0076 473/373 |
| 2013/0331205 A1* | 12/2013 | Tarao | ................. | C08G 18/4854 473/378 |

FOREIGN PATENT DOCUMENTS

| | | |
|---|---|---|
| EP | 2671619 A1 | 12/2013 |
| JP | 2011-67595 A | 4/2011 |
| JP | 2011-217820 A | 11/2011 |
| JP | 2011-255172 A | 12/2011 |
| JP | 2014-14386 A | 1/2014 |

* cited by examiner

GOLF BALL

FIELD OF THE INVENTION

The present invention relates to a golf ball, particularly a golf ball striking a good balance between a flight distance on driver shots and a spin rate on approach shots, and excellent in stain resistance and a shot feeling.

DESCRIPTION OF THE RELATED ART

A paint film is formed on a surface of the golf ball body. The improvement of the golf ball properties has been proposed by improving the paint film.

For example, Japanese Patent Publication No. 2011-67595 A discloses a golf ball comprising a core, a cover situated on the external side of the core, and a paint film situated on the external side of the cover, wherein the cover has a Shore D hardness of 61 or less, and the paint film has a Martens hardness of 2.0 mgf/μm$^2$ or less. The golf ball is excellent in spin performance, stability of the spin rate, and durability of the paint film.

Japanese Patent Publication No. 2011-217820 A discloses a golf ball comprising a golf ball body and a paint film formed on a surface of the golf ball body, wherein the paint film has a Martens hardness of 2.0 mgf/μm$^2$ or less, and a ratio (50% elastic modulus/10% elastic modulus) of 50% elastic modulus to 10% elastic modulus of 1.6 or more. The golf ball has a high spin rate on approach shots under the wet condition and rough condition.

In addition, a golf ball having an improved spin rate and flight distance which are achieved by adjusting the hardness distribution of a constituting member of the golf ball, has been proposed. For example, Japanese Patent Publication No. 2011-255172 A discloses a golf ball including a center portion, at least two intermediate tiers sequentially surrounding the center portion, and an outer tier surrounding the intermediate tiers, wherein the outer tier has a Shore D hardness in a range of 40 to 50; among the intermediate tiers, the first intermediate tier formed just below the outer tier has a Shore D hardness in a range of 50 to 65, and each intermediate tier formed just below the first intermediate tier has a Shore D hardness in a range of 30 to 70; the center portion has a Shore D hardness in a range of 30 to 70; and a moment of inertia value of the golf ball is 83 g·cm$^2$ or less.

SUMMARY OF THE INVENTION

The conventional technology improves spin performance by softening the paint film. Herein, the methods for softening the paint film include a method of decreasing the amount of the curing agent to decrease the crosslinking degree of the paint film. However, if the crosslinking degree of the paint film is decreased, a problem of stain resistance decrease of the paint film occurs. The present invention has been achieved in view of the above circumstances, and an object of the present invention is to provide a golf ball striking a good balance between a flight distance on driver shots and a spin rate on approach shots, and excellent in stain resistance and a shot feeling.

The present invention provides a golf ball comprising a golf ball body having a spherical core, an intermediate layer covering the spherical core and a cover covering the intermediate layer, and a paint film formed on a surface of the golf ball body, wherein a base resin constituting the paint film is a polyurethane obtained by a reaction between a polyol composition and a polyisocyanate composition, the polyol composition contains a urethane polyol including a polyether diol with a number average molecular weight ranging from 800 to 3000 as a constituent component, and a 10% modulus Mp (kgf/cm$^2$) of the paint film, a 10% modulus Mm (kgf/cm$^2$) of the intermediate layer, a 10% modulus Mc (kgf/cm$^2$) of the cover, a thickness Tp (mm) of the paint film, a thickness Tm (mm) of the intermediate layer, a thickness Tc (mm) of the cover, and a molar ratio (NCO/OH) X of an isocyanate group (NCO) in the polyisocyanate composition to a hydroxyl group (OH) in the polyol composition satisfy following requirements;

$Mp \leq 200 \times X - 75$ $Mp \leq 100$ $Mm - Mc > 100$ $Tm > Tc > Tp$ $(Tm \times Mm)/(Tc \times Mc) > 7.5$ $(Tc \times Mc)/(Tp \times Mp) > 2.4$.

In a preferable embodiment, the golf ball of the present invention further comprises an envelope layer disposed between the intermediate layer and the cover, wherein the 10% modulus Mm (kgf/cm$^2$) of the intermediate layer, a 10% modulus Me (kgf/cm$^2$) of the envelope layer, the 10% modulus Mc (kgf/cm$^2$) of the cover, the thickness Tp (mm) of the paint film, the thickness Tm (mm) of the intermediate layer, a thickness Te (mm) of the envelope layer, and the thickness Tc (mm) of the cover satisfy following requirements;

$Mm - Me > 50$ $Me - Mc > 55$ $Tm \geq Te > Tc > Tp$ $(Tm \times Mm)/(Te \times Me) > 1.8$ $(Te \times Me)/(Tc \times Mc) > 8.0$ The present invention also provides a golf ball comprising a golf ball body having a spherical core, an intermediate layer covering the spherical core, an envelope layer covering the intermediate layer, and a cover covering the envelope layer, and a paint film formed on a surface of the golf ball body, wherein a base resin constituting the paint film is a polyurethane obtained by a reaction between a polyol composition and a polyisocyanate composition, the polyol composition contains a urethane polyol including a polyether diol with a number average molecular weight ranging from 800 to 3000 as a constituent component, and a 10% modulus Mp (kgf/cm$^2$) of the paint film, a 10% modulus Mm (kgf/cm$^2$) of the intermediate layer, a 10% modulus Me (kgf/cm$^2$) of the envelope layer, a 10% modulus Mc (kgf/cm$^2$) of the cover, a thickness Tp (mm) of the paint film, a thickness Tm (mm) of the intermediate layer, a thickness Te (mm) of the envelope layer, a thickness Tc (mm) of the cover, and a molar ratio (NCO/OH) X of an isocyanate group (NCO) in the polyisocyanate composition to a hydroxyl group (OH) in the polyol composition satisfy following requirements;

$Mp \leq 200 \times X - 75$ $Mp \leq 100$ $$Mm-Me>50$$

$$Me-Mc>55$$

$$Tm \geq Te>Tc>Tp$$

$$(Tm \times Mm)/(Te \times Me)>1.8$$

$$(Te \times Me)/(Tc \times Mc)>8.0$$

$$(Tc \times Mc)/(Tp \times Mp)>2.4.$$

The present invention provides a golf ball striking a good balance between a flight distance on driver shots and a spin rate on approach shots, and excellent in stain resistance and a shot feeling.

DESCRIPTION OF THE PREFERRED EMBODIMENT

Figure 1:
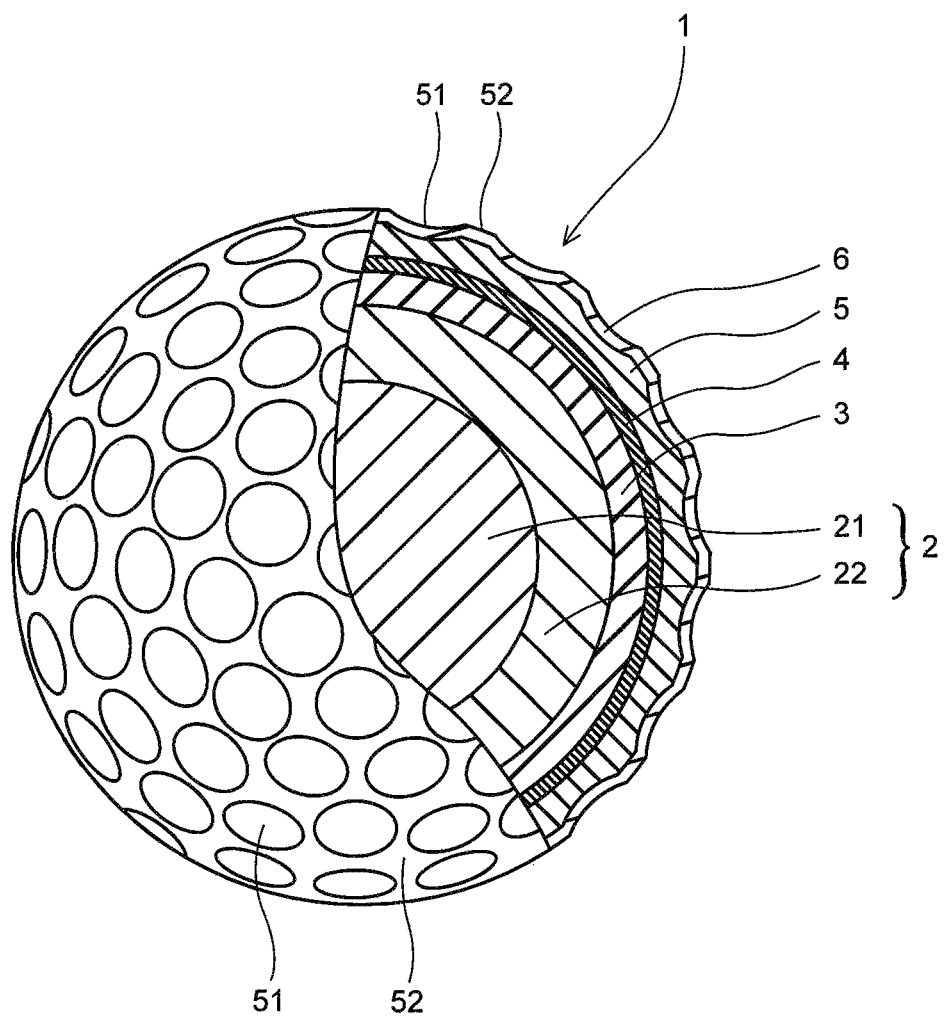
FIG. 1 is a partially cutaway sectional view showing the golf ball according to one embodiment of the present invention.

The present invention provides a golf ball comprising a golf ball body having a spherical core, an intermediate layer covering the spherical core and a cover covering the intermediate layer, and a paint film formed on a surface of the golf ball body.

[Paint Film]

Each constituting member of the golf ball of the present invention will be described below. The golf ball of the present invention comprises a golf ball body and a paint film formed on a surface of the golf ball body. A base resin constituting the paint film is a polyurethane obtained by a reaction between a polyol composition and a polyisocyanate composition.

The polyol composition contains a urethane polyol including a polyether diol with a number average molecular weight ranging from 800 to 3000 as a constituent component. By using such the urethane polyol, the obtained paint film is soft, and the resultant golf ball shows an improved spin performance on approach shots. The urethane polyol is a compound having a plurality of urethane bonds in the molecule thereof, and having at least two hydroxyl groups in one molecule. An example of the urethane polyol is a urethane prepolymer which is obtained by a reaction between a polyol and a polyisocyanate, under a condition that the hydroxyl groups of the polyol is excessive to the isocyanate groups of the polyisocyanate.

Examples of the polyether diol constituting the urethane polyol include polyoxyethylene glycol, polyoxypropylene glycol, and polyoxytetramethylene glycol. Among them, polyoxytetramethylene glycol is preferable.

The number average molecular weight of the polyether diol is 800 or more, preferably 900 or more, more preferably 1000 or more, and is 3000 or less, preferably 2000 or less, more preferably 1500 or less. If the number average molecular weight of the polyether diol is 800 or more, a distance between crosslinking points in the paint film becomes long and the paint film becomes soft, thus the spin performance improves. If the number average molecular weight of the polyether diol is 3000 or less, a distance between crosslinking points in the paint film does not become excessively long, thus the stain resistance of the paint film becomes better. The number average molecular weight of the polyol component can be measured, for example, by gel permeation chromatography (GPC), using polystyrene as a standard material, tetrahydrofuran as an eluate, and an organic solvent system GPC column (for example, "Shodex (registered trademark) KF series" available from Showa Denko K.K.) as a column.

The urethane polyol may include a low molecular weight polyol having a molecular weight of less than 500 other than the polyether diol as the polyol component. Examples of the low molecular weight polyol are a diol such as ethylene glycol, diethylene glycol, triethylene glycol, 1,3-butanediol, 1,4-butanediol, neopentyl glycol, 1,6-hexanediol; and a triol such as glycerin, trimethylolpropane, and hexanetriol. The low molecular weight polyol may be used solely or in combination of at least two of them.

The urethane polyol preferably includes a triol component and a diol component as the polyol component. Trimethylolpropane is preferred as the triol component. A mixing ratio (triol component/diol component) of the triol component to the diol component is preferably 0.2 or more, more preferably 0.5 or more, and is preferably 6.0 or less, more preferably 5.0 or less in a mass ratio.

The polyisocyanate component constituting the urethane polyol is not limited, as long as it has at least two isocyanate groups. Examples of the polyisocyanate component include an aromatic polyisocyanate such as 2,4-tolylene diisocyanate, 2,6-tolylene diisocyanate, a mixture of 2,4-tolylene diisocyanate and 2,6-tolylene diisocyanate (TDI), 4,4'-diphenylmethane diisocyanate (MDI), 1,5-naphthylene diisocyanate (NDI), 3,3'-bitolylene-4,4'-diisocyanate (TODD, xylylene diisocyanate (XDI), tetramethylxylylenediisocyanate (TMXDI), para-phenylene diisocyanate (PPDI); an alicyclic polyisocyanate or aliphatic polyisocyanate such as 4,4'-dicyclohexylmethane diisocyanate ($H_{12}$MDI), hydrogenated xylylenediisocyanate ($H_6$XDI), hexamethylene diisocyanate (HDI), isophorone diisocyanate (IPDI), and norbornene diisocyanate (NBDI). The polyisocyanate may be used solely or in combination of at least two of them.

In the urethane polyol, the content of the polyether diol having a number average molecular weight from 800 to 3000 is preferably 70 mass % or more, more preferably 72 mass % or more, and even more preferably 75 mass % or more. The polyether diol having a number average molecular weight from 800 to 3000 forms a soft segment in the paint film. Therefore, if the content of the polyether diol is 70 mass % or more, the obtained golf ball has a further improved spin performance.

The weight average molecular weight of the urethane polyol is preferably 5000 or more, more preferably 5300 or more, even more preferably 5500 or more, and is preferably 20000 or less, more preferably 18000 or less, even more preferably 16000 or less. If the weight average molecular weight of the urethane polyol is 5000 or more, a distance between cross linking points in the paint film becomes long and the paint film becomes soft, thus the spin performance improves. If the weight average molecular weight of the urethane polyol is 20000 or less, a distance between cross linking points in the paint film does not become excessively long, thus the stain resistance of the paint film becomes better.

The hydroxyl value of the urethane polyol is preferably 10 mgKOH/g or more, more preferably 15 mgKOH/g or more, even more preferably 20 mgKOH/g or more, and is preferably 200 mgKOH/g or less, more preferably 190 mgKOH/g or less, even more preferably 180 mgKOH/g or less.

The polyol composition may include a polyol compound other than the urethane polyol. Examples of the polyol compound include a low molecular weight polyol having a molecular weight of less than 500 and a high molecular weight polyol having an average molecular weight of 500 or more. Examples of the low molecular weight polyol are a diol such as ethylene glycol, diethylene glycol, triethylene glycol, 1,3-butanediol, 1,4-butanediol, neopentyl glycol, and 1,6-hexanediol; and a triol such as glycerin, trimethylolpropane, and hexanetriol. Examples of the high molecular weight polyol include a polyether polyol such as polyoxyethylene glycol (PEG), polyoxypropylene glycol (PPG), and polyoxytetramethylene glycol (PTMG); a condensed polyester polyol such as polyethylene adipate (PEA), polybutylene adipate (PBA), and polyhexamethylene adipate (PHMA); a lactone polyester polyol such as poly-ε-caprolactone (PCL); a polycarbonate polyol such as polyhexamethylene carbonate; and an acrylic polyol. The polyol compound may be used solely or in combination of at least two of them.

The content of the urethane polyol in the polyol compound contained in the polyol composition is preferably 60 mass % or more, more preferably 70 mass % or more, and even more preferably 80 mass % or more. It is also preferable that the polyol composition contains only the urethane polyol as the polyol compound.

The hydroxyl value of the polyol contained in the polyol composition is preferably 10 mgKOH/g or more, more preferably 15 mgKOH/g or more, even more preferably 20 mgKOH/g or more, and is preferably 400 mgKOH/g or less, more preferably 300 mgKOH/g or less, even more preferably 200 mgKOH/g or less, further more preferably 170 mgKOH/g or less, particularly preferably 160 mgKOH/g or less. If the hydroxyl value of the polyol component falls within the above range, the adhesion of the paint film to the golf ball body improves. In the present invention, the hydroxyl value can be measured by using, for example, an acetylization method, in accordance with JIS K 1557-1.

Specific examples of the polyol compound are 121 B available from Wayaku Paint Co.; Nippollan 800, Nippollan 1100 available from Nippon Polyurethane Industry Co., Ltd; Burnock D6-627, Burnock D8-436, Burnock D8-973, Burnock11-408 available from DIC Corporation; Desmophen 650 MPA, Desmophen 670, Desmophen 1150, Desmophen A160X available from Sumika Bayer Urethane Co., Ltd; and Hariacron 2000, Hariacron 8500H available from Harima Chemicals, Inc.

Next, the polyisocyanate composition will be described. The polyisocyanate composition comprises one or more polyisocyanate compound. Examples of the polyisocyanate compound include a compound having at least two isocyanate groups.

Examples of the polyisocyanate compound include an aromatic diisocyanate such as 2,4-tolylene diisocyanate, 2,6-tolylene diisocyanate, a mixture (TDI) of 2,4-tolylene diisocyanate and 2,6-tolylene diisocyanate, 4,4'-diphenylmethane diisocyanate (MDI), 1,5-naphthylene diisocyanate (NDI), 3,3'-bitolylene-4,4'-diisocyanate (TODI, xylylene diisocyanate (XDI), tetramethylxylylenediisocyanate (TMXDI) and para-phenylene diisocyanate (PPDI); an alicyclic diisocyanate or aliphatic diisocyanate such as 4,4'-dicyclohexylmethane diisocyanate ($H_{12}$MDI), hydrogenated xylylenediisocyanate ($H_6$XDI), hexamethylene diisocyanate (HDI), isophorone diisocyanate (IPDI), norbornene diisocyanate (NBDI); and a triisocyanate such as an allophanate-modified product, a biuret-modified product, an isocyanurate-modified product and an adduct of the above diisocyanate. In the present invention, two or more polyisocyanates are preferably used.

The allophanate-modified product is, for example, a triisocyanate which is obtained by further reacting a diisocyanate with a urethane bond formed through a reaction between a diisocyanate and a low molecular weight diol. The biuret-modified product is a triisocyanate which is obtained through a reaction between a diisocyanate and a low molecular weight triol such as trimethylolpropane or glycerin. The biuret-modified product is, for example, a triisocyanate having a biuret bond represented by the following formula (1). The isocyanurate-modified product of diisocyanate is, for example, a triisocyanate represented by the following formula (2).

[Formula 1]

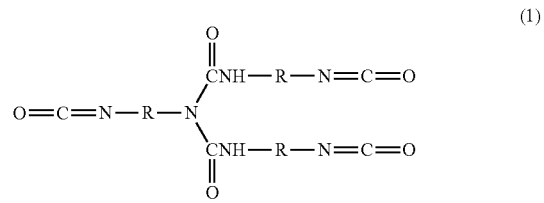

(1)

[Formula 2]

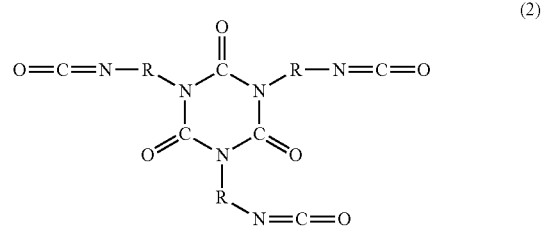

(2)

In the formulae (1) and (2), R represents a residue where isocyanate groups are removed from the diisocyanate.

As the triisocyanate, an isocyanurate-modified product of hexamethylene diisocyanate, a biuret-modified product of hexamethylene diisocyanate, and an isocyanurate-modified product of isophorone diisocyanate are preferable. Especially, in the case of using the biuret-modified product of hexamethylene diisocyanate and the isocyanurate-modified product of hexamethylene diisocyanate in combination, a mixing ratio (biuret-modified product/isocyanurate-modified product) thereof preferably ranges from 20/40 to 40/20, and more preferably ranges from 25/35 to 35/25.

In the present invention, the polyisocyanate composition preferably contains the triisocyanate compound. The content of the triisocyanate compound in the polyisocyanate contained in the polyisocyanate composition is preferably 50 mass % or more, more preferably 60 mass % or more, and even more preferably 70 mass % or more. It is most preferable that the polyisocyanate composition contains only the triisocyanate compound as the polyisocyanate compound.

The content of the isocyanate group (NCO %) of the polyisocyanate contained in the polyisocyanate composition is preferably 0.5 mass % or more, more preferably 1 mass % or more, even more preferably 2 mass % or more, and is preferably 45 mass % or less, more preferably 40 mass % or less, even more preferably 35 mass % or less. The content of the isocyanate group (NCO %) of the polyisocyanate can be defined by the following expression.

NCO(%)=100×[mole number of isocyanate group in polyisocyanate×42(molecular weight of NCO)]/ total mass(g) of polyisocyanate Specific examples of the polyisocyanate are Burnock D-800, Burnock DN-950, Burnock DN-955 available from DIC corporation; Desmodur N75MPA/X, Desmodur N3300, Desmodur L75 (C), Sumidur E21-1 available from Sumika Bayer Urethane CO., Ltd; Coronate HX, Coronate HK available from Nippon Polyurethane Industry Co., Ltd; Duranate 24A-100, Duranate 21S-75E, Duranate TPA-100, Durante TKA-100 available from Asahi Kasei Chemicals Corporation; and VESTANAT T1890 available from Degussa.

In the reaction between the polyol composition and the polyisocyanate composition, the molar ratio (NCO/OH) of the isocyanate group (NCO) of the polyisocyanate composition to the hydroxyl group (OH) of the polyol composition is preferably more than 0.5, more preferably 0.55 or more, and even more preferably 0.60. If the molar ratio (NCO/OH) is more than 0.5, the cross-linking density becomes high, thus the stain resistance of the obtained paint film becomes better. Further, if the molar ratio (NCO/OH) is too large, the amount of the isocyanate group becomes excessive, and the obtained paint film not only becomes hard and fragile but also the appearance thereof may deteriorate. Thus, the molar ratio (NOC/OH) is preferably 1.20 or less, more preferably 1.15 or less, and even more preferably 1.10 or less. The reason why the appearance of the obtained paint film deteriorates if the amount of the isocyanate group is excessive in the paint is considered to be that, an excessive amount of isocyanate group in the paint may promote a reaction between the moisture in the air and the isocyanate group, thereby generating a lot of carbon dioxide gas.

The paint film of the golf ball of the present invention is preferably formed from a paint containing the polyol composition and the polyisocyanate composition. An example of the paint is a so-called two-component curing type paint containing the polyol as a base material and the polyisocyanate as a curing agent. The paint may be either a waterborne paint mainly containing water as a dispersion medium or a solvent-based paint mainly containing an organic solvent as a dispersion medium. In the case of the solvent-based paint, preferable solvents are, for example, toluene, isopropyl alcohol, xylene, methyl ethyl ketone, methyl ethyl isobutyl ketone, ethyleneglycol monomethyl ether, ethyl benzene, propyleneglycol monomethyl ether, isobutyl alcohol, and ethyl acetate.

The paint may further contain, where necessary, an additive such as a filler, an ultraviolet absorber, an antioxidant, a light stabilizer, a fluorescent brightener, an anti-blocking agent, a leveling agent, a slip agent and a viscosity modifier, which are generally contained in the paint for a golf ball.

Next, the applying method of the curing type paint of the present invention will be described. The applying method of the curing type paint is not limited, and includes conventional methods, for example, spray coating method or electrostatic coating method.

In the case of applying the paint with an air gun, the polyol composition and the polyisocyanate composition may be fed with the respective pumps and continuously mixed through the line mixer located in the stream line just before the air gun, and the obtained mixture can be air-sprayed. Alternatively, the polyol composition and the polyisocyanate composition can be air-sprayed respectively with an air spray system having a device for controlling the mixing ratio thereof. The paint application may be conducted by spraying the paint for one time or overpainting the paint for multiple times.

The curing type paint applied to the golf ball body can be dried, for example, at a temperature ranging from 30° C. to 70° C. for 1 hour to 24 hours to form the paint film.

(Tp)

The thickness Tp of the paint film after drying is preferably 5 μm or more, more preferably 10 μm or more, and even more preferably 15 μm or more. If the thickness is less than 5 μm, the paint film is likely to wear off due to the continued use. Further, by thickening the paint film, the spin rate on approach shots increases. The thickness of the paint film is preferably 50 μm or less, more preferably 45 μm or less, and even more preferably 40 μm or less. If the thickness of the paint film is more than 50 μm, the dimple effect is lowered, thus the flight performance of the golf ball tends to be low. The thickness of the paint film can be measured, for example, by observing the cross section of the golf ball using a microscope (VHX-1000 available from Keyence Corporation). In the case of overpainting the paint for multiple times, a total thickness of the whole paint film formed preferably falls within the above range.

(Mp)

The 10% modulus Mp of the paint film is 100 kgf/cm$^2$ (9.8 MPa) or less, preferably 90 kgf/cm$^2$ (8.8 MPa) or less, and more preferably 80 kgf/cm$^2$ (7.8 MPa) or less. If the 10% modulus of the paint film is more than 100 kgf/cm$^2$, the shot feeling becomes bad, and the spin rate on approach shots decreases. The lower limit of the 10% modulus of the paint film is not particularly limited, but 5 kgf/cm$^2$ (0.49 MPa) is preferable, and 10 kgf/cm$^2$ (0.98 MPa) is more preferable. If the 10% modulus of the paint film is excessively low, the paint film becomes too soft and tacky. Thus, the feeling becomes worse.

$$(Mp \leq 200 \times X - 75)$$

The 10% modulus Mp (kgf/cm$^2$) of the paint film and the molar ratio (NCO/OH) X of the isocyanate groups (NCO) in the polyisocyanate composition to the hydroxyl groups (OH) in the polyol composition satisfy the following equation. The paint film satisfying the following equation results in a high spin rate on approach shots, and has excellent stain resistance, since the softness of the paint film can be maintained even increasing the molar ratio (NCO/OH).

$$Mp \leq 200 \times X - 75$$

(Tp×Mp)

The value (Tp×Mp) obtained by multiplying the thickness Tp (mm) of the paint film and the 10% modulus Mp (kgf/cm$^2$) of the paint film is preferably 0.2 or more, more preferably 0.4 or more, even more preferably 0.5 or more, and is preferably 4.0 or less, more preferably 3.0 or less, even more preferably 2.5 or less. If the value (Tp×Mp) is 0.2 or more, stain resistance of the paint film further improves, and if the value (Tp×Mp) is 4.0 or less, the spin performance of the golf ball on approach shots further improves.

[Golf Ball Body]

The golf ball body comprises a spherical core, an intermediate layer covering the spherical core, and a cover covering the intermediate layer. Examples of the structure of the golf ball body include: a structure (structure A) having a spherical core, an intermediate layer covering the spherical core, and a cover covering the intermediate layer; and a structure (structure B) having a spherical core, an intermediate layer covering the spherical core, an envelope layer covering the intermediate layer, and a cover covering the envelope layer, and the like.

The structure of the spherical core is not particularly limited, may a single layered structure or a multi-layered structure having at least two layers. A two layered core consisting of a spherical inner core and an outer core covering the inner core is preferable, because the hardness is easily designed.

The spherical core preferably has a hardness difference (Hs−Ho) between a surface hardness Hs and a center hardness Ho thereof of 20 or more, more preferably 24 or more, and even more preferably 28 or more in JIS-C hardness. If the hardness difference (Hs−Ho) is 20 or more, the spin rate on driver shots decreases and the flight distance increases. The upper limit of the hardness difference (Hs−Ho) is not particularly limited, the hardness difference (Hs−Ho) is preferably 50 or less, more preferably 45 or less, and even more preferably 40 or less in JIS-C hardness.

The spherical core preferably has the center hardness Ho of 40 or more, more preferably 50 or more, and even more preferably 55 or more in JIS-C hardness. If the center hardness Ho of the spherical core is 40 or more in JIS-C hardness, resilience becomes better. In addition, the spherical core preferably has the center hardness Ho of 80 or less, more preferably 76 or less, and even more preferably 72 or less in JIS-C hardness. If the center hardness Ho is 80 or less in JIS-C hardness, the spin rate on driver shots is low.

The spherical core preferably has a surface hardness Hs of 80 or more, more preferably 82 or more, even more preferably 84 or more, and preferably has a surface hardness Hs of 96 or less, more preferably 94 or less, even more preferably 92 or less in JIS-C hardness. If the surface hardness of the spherical core is 80 or more in JIS-C hardness, the spin rate on driver shots is low. In addition, if the surface hardness of the spherical core is 96 or less in JIS-C hardness, the spherical core does not become excessively hard, thus durability becomes better The spherical core may employ a publicly known rubber composition (hereinafter simply referred to as "core rubber composition" occasionally), and may be molded by heat-pressing, for example, a rubber composition containing a base rubber, a co-crosslinking agent and a crosslinking initiator.

As the base rubber, particularly preferred is a high cis-polybutadiene having a cis-bond in a proportion of 40 mass % or more, more preferably 70 mass % or more, and even more preferably 90 mass % or more in view of its superior repulsion property.

As the co-crosslinking agent, an α, β-unsaturated carboxylic acid having 3 to 8 carbon atoms or a metal salt thereof is preferable, and a metal salt of acrylic acid or a metal of methacrylic acid is more preferable. As the metal of the metal salt, zinc, magnesium, calcium, aluminum or sodium is preferable, and zinc is more preferable. The amount of the co-crosslinking agent to be used is preferably 20 parts or more and 50 parts or less by mass, with respect to 100 parts by mass of the base rubber.

As the crosslinking initiator, an organic peroxide is preferably used. Specific examples of the organic peroxide are dicumyl peroxide, 1,1-bis(t-butylperoxy)-3,3,5-trimethylcyclohexane, 2,5-di methyl-2,5-di(t-butyl peroxy)hexane, and di-t-butyl peroxide. Among them, dicumyl peroxide is preferably used. The amount of the crosslinking initiator to be blended is preferably 0.2 part by mass or more, more preferably 0.3 part by mass or more, and is preferably 3 parts by mass or less, more preferably 2 parts by mass or less, with respect to 100 parts by mass of the base rubber.

The core rubber composition may further contain an organic sulfur compound. As the organic sulfur compound, diphenyl disulfides, thiophenols or thionaphthols may be preferably used. The amount of the organic sulfur compound to be blended is preferably 0.1 part by mass or more, more preferably 0.3 part by mass or more, and is preferably 5.0 parts by mass or less, more preferably 3.0 parts by mass or less, with respect to 100 parts by mass of the base rubber.

The core rubber composition may further contain a fatty acid and/or a metal salt thereof. The fatty acid may be any one of a saturated fatty acid and an unsaturated fatty acid, but the saturated fatty acid is preferable. Examples of the saturated fatty acid include caprylic acid (octanoic acid), pelargonic acid (nonanoic acid), capric acid (decanoic acid), lauric acid, myristic acid, palmitic acid, stearic acid, and behenic acid. As the metal of the metal salt, zinc, magnesium, calcium, aluminum, and sodium are preferable, and zinc is more preferable. It is noted that the fatty acid and/or the metal salt thereof does not include the α, β-unsaturated carboxylic acid having 3 to 8 carbon atoms and/or the metal salt thereof used as the co-crosslinking agent.

The content of the fatty acid and/or the metal salt thereof is 1 part by mass or more and 40 parts by mass or less, with respect to 100 parts by mass of the base rubber. In addition, there is a case where the surface of zinc acrylate used as the co-crosslinking agent is treated with zinc stearate to improve the dispersibility of zinc acrylate to the rubber. In the case of using such the zinc acrylate whose surface is treated with zinc stearate, the amount of zinc stearate used as a surface treating agent is included in the content of the fatty acid and/or the metal salt thereof.

The core rubber composition may further contain a weight adjusting agent such as zinc oxide and barium sulfate, an antioxidant, or a colored powder in addition to the base rubber, the co-crosslinking agent, the crosslinking initiator, and the organic sulfur compound. The conditions for heat-pressing the core rubber composition may be determined appropriately according to the rubber composition. Generally, the heat-pressing is preferably carried out for 10 to 60 minutes at a temperature of 130° C. to 200° C. or carried out in a two-step heating of heating 20 to 40 minutes at a temperature of 130° C. to 150° C. followed by heating for 5 to 15 minutes at a temperature of 160° C. to 180° C.

[Intermediate Layer]

The golf ball body comprises an intermediate layer disposed outside the spherical core. The intermediate layer preferably has a comparatively large 10 modulus value. By disposing such the intermediate layer, the spin rate of the golf ball on driver shots can be decreased.

(Tm)

The thickness Tm of the intermediate layer is preferably 0.7 mm or more, more preferably 0.8 mm or more, even more preferably 0.9 mm or more, and is preferably 1.6 mm or less, more preferably 1.4 mm or less, even more preferably 1.2 mm or less. If the thickness of the intermediate layer is 0.7 mm or more, the durability of the golf ball improves, and if the thickness of the intermediate layer is 1.6 mm or less, the core diameter becomes relatively large and the resilience performance improves.

(Mm)

The 10% modulus Mm of the intermediate layer is preferably 120 kgf/cm$^2$ (11.8 MPa) or more, more preferably 140 kgf/cm$^2$ (13.7 MPa) or more, and even more preferably 160 kgf/cm$^2$ (15.7 MPa) or more. If the 10% modulus of the intermediate layer is 120 kgf/cm$^2$ or more, the spin rate on driver shots decreases and the flight distance increases. The upper limit of the 10% modulus of the intermediate layer is not particularly limited, but 400 kgf/cm$^2$ (39.2 MPa) is preferable, and 370 kgf/cm$^2$ (36.3 MPa) is more preferable.
(Hm)

The hardness of the intermediate layer is preferably 62 or more, more preferably 65 or more, even more preferably 68 or more, and is preferably 75 or less, more preferably 74 or less, even more preferably 73 or less in Shore D hardness. If the hardness is 62 or more in Shore D hardness, the spin rate on driver shots decreases and the flight distance further increases. In addition, if the hardness is 75 or less in Shore D hardness, the shot feeling becomes good and the spin rate on approach shots also increases. The hardness of the intermediate layer is a slab hardness obtained by measuring the intermediate layer composition for forming the intermediate layer molded into a sheet form.

Examples of the material of the intermediate layer include: a thermoplastic resin such as polyurethane resin, ionomer resin, polyamide resin, and polyethylene; a thermoplastic elastomer such as styrene elastomer, polyolefin elastomer, polyurethane elastomer, and polyester elastomer; a vulcanized product of a rubber composition; and the like. Herein, examples of the ionomer resin include: a product obtained by neutralizing at least a part of carboxyl groups in a copolymer composed of ethylene and an α, β-unsaturated carboxylic acid with a metal ion; and a product obtained by neutralizing at least a part of carboxyl groups in a ternary copolymer composed of ethylene, an α, β-unsaturated carboxylic acid, and an α, β-unsaturated carboxylic acid ester with a metal ion. The intermediate layer may further contain a specific gravity adjusting agent such as barium sulfate and tungsten, an antioxidant, a pigment, or the like.

Specific examples of the material of the intermediate layer include: an ionomer resin having a trade name of "Himilan (registered trademark)" or an ethylene-methacrylic acid copolymer having a trade name of "Nucrel (registered trademark)" commercially available from Du Pont-Mitsui Polychemicals Co., Ltd.; a thermoplastic polyurethane elastomer having a trade name of "Elastollan (registered trademark)" commercially available from BASF Japan Ltd; a thermoplastic polyamide elastomer having a trade name of "Pebax (registered trademark)" commercially available from Arkema Inc.; a thermoplastic polyester elastomer having a trade name of "Hytrel (registered trademark)" commercially available from Du Pont-Toray Co., Ltd.; a thermoplastic styrene elastomer having a trade name of "Rabalon (registered trademark)" or a thermoplastic polyester elastomer having a trade name of "Primalloy (registered trademark)" commercially available from Mitsubishi Chemical Corporation; and the like. These materials of the intermediate layer may be used solely or in combination of at least two types thereof.

The intermediate layer can be formed by injection molding the intermediate layer composition directly onto the spherical core.

[Envelope Layer]

The golf ball body may further comprise an envelope layer disposed outside the intermediate layer. The envelope layer preferably has a 10% modulus value smaller than that of the intermediate layer and larger than that of the cover. By disposing such the envelope layer, the shot feeling becomes better, and a better balance between the flight distance on driver shots and the spin rate on approach shots can be achieved. Examples of the material of the envelope layer include the materials similar to those used for the intermediate layer.

[Cover]

The golf ball body comprises a cover disposed outside the intermediate layer. The cover has a comparatively small 10% modulus value. By disposing such the cover, the spin performance on approach shots becomes better.
(Mc)

The 10% modulus Mc of the cover is preferably 20 kgf/cm$^2$ (2.0 MPa) or less, more preferably 18 kgf/cm$^2$ (1.8 MPa) or less, and even more preferably 15 kgf/cm$^2$ (1.5 MPa) or less. If the 10% modulus of the cover is 20 kgf/cm$^2$ or less, the shot feeling becomes better, and the spin rate on approach shots also increases. The lower limit of the 10% modulus of the cover is not particularly limited, but 3 kgf/cm$^2$ (0.3 MPa) is preferable, and 6 kgf/cm$^2$ (0.6 MPa) is more preferable.
(|Mp−Mc|)

The absolute value (|Mp−Mc|) of the difference between the 10% modulus Mp (kgf/cm$^2$) of the paint film and the 10% modulus Mc (kgf/cm$^2$) of the cover is preferably 65 kgf/cm$^2$ (6.4 Mpa) or less, more preferably 60 kgf/cm$^2$ (5.9 Mpa) or less, and even more preferably 55 kgf/cm$^2$ (5.4 Mpa) or less. If the absolute value (|Mp−Mc|) is 65 kgf/cm$^2$ or less, the shot feeling becomes better, and the spin rate on approach shots increases. The lower limit of the absolute value (|Mp−Mc|) is 0.
(Hc)

The hardness of the cover is preferably 20 or more, more preferably 23 or more, even more preferably 25 or more, and is preferably 38 or less, more preferably 36 or less, even more preferably 34 or less in Shore D hardness. If the hardness of the cover is 20 or more in Shore D hardness, the spin rate on driver shots decreases and the flight distance further increases. In addition, if the hardness of the cover is 38 or less in Shore D hardness, the spin performance on approach shots becomes better. The hardness of the cover is a slab hardness obtained by measuring the cover composition for forming the cover molded into a sheet form.

The cover material constituting the cover is not particularly limited, and examples thereof include an ionomer resin, polyurethane, polyamide, polyester, and polystyrene. Among them, the polyurethane and ionomer resin are preferable. Especially, in terms of the spin performance on approach shots and abrasion resistance, the polyurethane is preferable.

The polyurethane may be either a thermoplastic polyurethane or a thermosetting polyurethane. The thermoplastic polyurethane is a polyurethane exhibiting plasticity by heating and generally means a polyurethane having a linear chain structure of a high-molecular weight to a certain extent. On the other hand, the thermosetting polyurethane (two-component curing type polyurethane) is a polyurethane obtained by polymerization through a reaction between a low-molecular weight urethane prepolymer and a curing agent (chain extender) when molding the cover. The thermosetting polyurethane includes a polyurethane having a linear chain structure or a polyurethane having a three-dimensional crosslinked structure depending on a number of a functional group of the prepolymer or the curing agent (chain extender) to be used. As the polyurethane, a thermoplastic elastomer is preferable.

Examples of the ionomer resin include: a product obtained by neutralizing, with a metal ion, at least part of the carboxylic groups in a binary copolymer composed of an olefin and an α, β-unsaturated carboxylic acid having 3 to 8 carbon atoms; a product obtained by neutralizing, with a metal ion, at least part of the carboxylic groups in a ternary copolymer composed of an olefin, an α, β-unsaturated carboxylic acid having 3 to 8 carbon atoms and an α, β-unsaturated carboxylic acid ester; a mixture thereof. The olefin preferably includes an olefin having 2 to 8 carbon atoms. Examples of the olefin include ethylene, propylene, butene, pentene, hexene, heptene, octane and the like. Among them, ethylene is particularly preferred. Examples of the α, β-unsaturated carboxylic acid having 3 to 8 carbon atoms include acrylic acid, methacrylic acid, fumaric acid, maleic acid, crotonic acid and the like. Among these, acrylic acid and methacrylic acid are particularly preferred. Examples of the α, β-unsaturated carboxylic acid ester include methyl ester, ethyl ester, propyl ester, n-butyl ester, isobutyl ester of acrylic acid, methacrylic acid, fumaric acid, maleic acid and the like. Among them, acrylic acid ester and methacrylic acid ester are particularly preferable. Among these ionomer resins, a metal ion-neutralized product of a binary copolymer of ethylene-(meth)acrylic acid, and a metal ion-neutralized product of a ternary copolymer of ethylene-(meth)acrylic acid-(meth)acrylic acid ester are preferable.

Examples of the cover material include: an ionomer resin having a trade name of "Himilan (registered trademark)" commercially available from Du Pont-Mitsui Polychemicals Co., Ltd., a thermoplastic polyurethane elastomer having a trade name of "Elastollan (registered trademark)" commercially available from BASF Japan Ltd, a thermoplastic polyamide elastomer having a trade name of "Pebax (registered trademark)" commercially available from Arkema Inc., a thermoplastic polyester elastomer having a trade name of "Hytrel (registered trademark)" commercially available from Du Pont-Toray Co., Ltd., a thermoplastic styrene elastomer having a trade name of "Rabalon (registered trademark)" or a thermoplastic polyester elastomer having a trade name of "Primalloy (registered trademark)" commercially available from Mitsubishi Chemical Corporation, and the like. These cover materials may be used solely or in combination of at least two types thereof.

The cover may contain a pigment component such as a white pigment (for example, titanium oxide), a blue pigment and a red pigment, a specific gravity adjusting agent such as calcium carbonate and barium sulfate, a dispersant, an antioxidant, an ultraviolet absorber, a light stabilizer (for example, a hindered amine light stabilizer), a fluorescent material, a fluorescent brightener, or the like, as long as they do not impair the performance of the cover.

The embodiment for molding the cover from the cover composition is not particularly limited, and includes an embodiment which comprises injection molding the cover composition directly onto the core, or an embodiment which comprises molding the cover composition into a hollow shell, covering the core with a plurality of the hollow shells and subjecting the core with a plurality of the hollow shells to the compression-molding (preferably the embodiment which comprises molding the cover composition into a half hollow-shell, covering the core with two of the half hollow-shells and subjecting the core with two of the half hollow-shells to the compression-molding). After the cover is molded, the golf ball body is taken out from the mold, and as necessary, the golf ball body is preferably subjected to surface treatments such as deburring, cleaning, and sand-blast. If desired, a mark may be formed.

The total number of the dimples formed on the cover is preferably 200 or more and 500 or less. If the total number of the dimples is less than 200, the dimple effect is hardly obtained. On the other hand, if the total number exceeds 500, the dimple effect is hardly obtained because the size of the respective dimples is small. The dimple shape (shape in a plan view) includes, for example, without limitation, a circle; a polygonal shape such as a roughly triangular shape, a roughly quadrangular shape, a roughly pentagonal shape, and a roughly hexagonal shape; and another irregular shape. The dimple shape is employed solely or in combination at least two of them.

In the present invention, the ratio of the sum of the areas of dimples to the surface area of a phantom sphere is referred to as an occupation ratio. The phantom sphere is a golf ball (spherical body) when assuming that there is no dimple on the surface thereof. In the golf ball of the present invention, the occupation ratio of the dimples is preferably 60% or more, more preferably 63% or more, even more preferably 66% or more, and is preferably 90% or less, more preferably 87% or less, even more preferably 84% or less. If the occupation ratio is too high, the contribution of the paint film to the coefficient of friction becomes small. Further, if the occupation ratio is too low, the flight performance is lowered.

The area of the dimple refers to the area enclosed in the periphery of the dimple when observing the central point of the golf ball from infinity. In the case of the circular dimple, the area S of the dimple is calculated from the following formula.

$$S=(Di/2)^2 \cdot \pi \quad (Di: \text{diameter of the dimple})$$

The golf ball body may further comprise a reinforcing layer between the intermediate layer and the cover or between the envelope layer and the cover. The reinforcing layer adheres to the intermediate layer or the envelope layer as well as the cover firmly. The reinforcing layer suppresses the delamination of the cover from the intermediate layer or the envelope layer. Especially, if the golf ball having a thin cover is hit with the edge of the club face, the wrinkles tend to occur. The reinforcing layer suppresses the wrinkles.

The reinforcing layer is formed from a reinforcing layer composition containing a resin component. As the resin component, a two-liquid component curing type thermosetting resin is suitably used. Specific examples of the two-liquid component curing type thermosetting resin are an epoxy resin, a urethane resin, an acrylic resin, a polyester based resin, and a cellulose based resin. From the aspect of the strength and durability of the reinforcing layer, the two-liquid component curing type epoxy resin and two-liquid component curing type urethane resin are preferable.

The reinforcing layer composition may further contain an additive such as a coloring material (e.g. titanium oxide), a phosphoric acid based stabilizer, an antioxidant, a light stabilizer, a fluorescent whitening agent, a UV absorber, and a blocking inhibitor. The additive may be added into the base agent or the curing agent of the two-liquid component curing type thermosetting resin.

The golf ball body preferably has a diameter ranging from 40 mm to 45 mm. In light of satisfying a regulation of US Golf Association (USGA), the diameter is preferably 42.67 mm or more. In light of prevention of the air resistance, the diameter is preferably 44 mm or less, and more preferably 42.80 mm or less. The golf ball preferably has a mass of 40 g or more and 50 g or less. In light of obtaining greater inertia, the golf ball more preferably has a mass of 44 g or more, and even more preferably 45 g or more. In light of satisfying a regulation of USGA, the golf ball preferably has a mass of 45.93 g or less.

Examples of the structure of the golf ball body include: a structure (structure A) having a spherical core, an intermediate layer covering the spherical core, and a cover covering the intermediate layer; and a structure (structure B) having a spherical core, an intermediate layer covering the spherical core, an envelope layer covering the intermediate layer, and a cover covering the envelope layer, and the like.

[Structure A] and/or [Structure b]

In the case of the structure A, the 10% modulus Mp (kgf/cm$^2$) of the paint film, the 10% modulus Mm (kgf/cm$^2$) of the intermediate layer, the 10% modulus Mc (kgf/cm$^2$) of the cover, the thickness Tp (mm) of the paint film, the thickness Tm (mm) of the intermediate layer, the thickness Tc (mm) of the cover, and the molar ratio (NCO/OH) X of the isocyanate groups (NCO) in the polyisocyanate composition to the hydroxyl groups (OH) in the polyol composition satisfy the following requirements;

$$Mm-Mc>100$$

$$Tm>Tc>Tp$$

$$(Tm \times Mm)/(Tc \times Mc) > 7.5$$

$$(Tc \times Mc)/(Tp \times Mp) > 2.4.$$

Regarding the intermediate layer, cover and paint film of the golf ball, it is designed that, nearer to the surface of the ball the position is, softer and thinner the layer is. By adopting such the configuration, the golf ball showing a high spin rate on approach shots and a low spin rate on driver shots can be obtained. In addition, Mp of the paint film is 100 kgf/cm$^2$ or less, and Mp and X satisfy the above relation. That is, the softness of the paint film is good even increasing the molar ratio (NCO/OH), thus the spin rate on approach shots is high and stain resistance is excellent.

(Mm−Mc)

A difference (Mm−Mc) between the 10% modulus Mm (kgf/cm$^2$) of the intermediate layer and the 10% modulus Mc (kgf/cm$^2$) of the cover is more than 100 kgf/cm$^2$ (9.8 Mpa), preferably more than 150 kgf/cm$^2$ (14.7 Mpa), and more preferably more than 180 kgf/cm$^2$ (17.7 Mpa). If the difference (Mm−Mc) is 100 kgf/cm$^2$ or less, the spin rate on driver shots increases and the flight distance decreases, or the spin rate on approach shots decreases. The upper limit of the difference (Mm−Mc) is not particularly limited, but generally 350 kgf/cm$^2$ (34.3 Mpa), preferably 320 kgf/cm$^2$ (31.4 Mpa), and more preferably 300 kgf/cm$^2$ (29.4 Mpa).

(Tm>Tc>Tp)

The thickness Tm of the intermediate layer is larger than the thickness Tc of the cover (Tm>Tc), and the thickness Tc of the cover is larger than the thickness Tp of the paint film (Tc>Tp). If the thickness Tm of the intermediate layer is smaller than or equal to the thickness Tc of the cover, or the thickness Tc of the cover is smaller than or equal to the thickness Tp of the paint film, the spin rate on driver shots increases and the flight distance decreases, or the spin rate on approach shots decreases.

((Tm×Mm)/(Tc×Mc))

A ratio ((Tm×Mm)/(Tc×Mc)) of the value (Tm×Mm) obtained by multiplying the thickness Tm (mm) of the intermediate layer and the 10% modulus Mm (kgf/cm$^2$) of the intermediate layer to the value (Tc×Mc) obtained by multiplying the thickness Tc (mm) of the cover and the 10% modulus Mc (kgf/cm$^2$) of the cover, is more than 7.5, preferably more than 9.0, and more preferably more than 10.0. If the ratio ((Tm×Mm)/(Tc×Mc)) is 7.5 or less, the spin rate on driver shots increases and the flight distance decreases, or the spin rate on approach shots decreases. The upper limit of the ratio ((Tm×Mm)/(Tc×Mc)) is not particularly limited, but preferably 100 or less, more preferably 75 or less, and even more preferably 60 or less.

((Tc×Mc)/(Tp×Mp))

A ratio ((Tc×Mc)/(Tp×Mp)) of the value (Tc×Mc) obtained by multiplying the thickness Tc (mm) of the cover and the 10% modulus Mc (kgf/cm$^2$) of the cover to the value (Tp×Mp) obtained by multiplying the thickness Tp (mm) of the paint film and the 10% modulus Mp (kgf/cm$^2$) of the paint film, is more than 2.4, preferably more than 2.7, and more preferably more than 3.0. If the ratio ((Tc×Mc)/(Tp× Mp)) is 2.4 or less, the spin rate on driver shots increases and the flight distance decreases, or the spin rate on approach shots decreases. The upper limit of the ratio ((Tc×Mc)/(Tp× Mp)) is not particularly limited, but preferably 26 or less, more preferably 23 or less, and even more preferably 20 or less.

Especially in the case of the structure A, the spherical core, intermediate layer and cover preferably satisfy the following requirements.

The spherical core preferably has a diameter of 38.0 mm or more, more preferably 38.5 mm or more, and even more preferably 39.5 mm or more. If the spherical core has a diameter of 38.0 mm or more, the resilience becomes better. The upper limit of the diameter of the spherical core is not particularly limited, but preferably 41.5 mm or less, more preferably 41.0 mm or less, and even more preferably 40.5 mm or less When the spherical core has a diameter ranging from 38.0 mm to 41.5 mm, a compression deformation amount (a shrinking amount of the core in the compression direction thereof) of the spherical core when applying a load from an initial load of 98 N to a final load of 1275 N to the spherical core is preferably 2.3 mm or more, more preferably 2.5 mm or more, and is preferably 4.5 mm or less, more preferably 4.2 mm or less. If the compression deformation amount is 2.3 mm or more, the shot feeling becomes better, and if the compression deformation amount is 4.5 mm or less, the resilience becomes better.

(Tm×Mm)

The value (Tm×Mm) obtained by multiplying the thickness Tm (mm) of the intermediate layer and the 10% modulus Mm (kgf/cm$^2$) of the intermediate layer is preferably 120 or more, more preferably 140 or more, even more preferably 160 or more, and is preferably 400 or less, more preferably 370 or less, even more preferably 340 or less. If the value (Tm×Mm) is 120 or more, the spin rate on driver shots decreases and the flight distance further increases, and if the value (Tm×Mm) is 400 or less, the spin performance on approach shots further improves.

(Vm)

A ratio of the volume Vm of the intermediate layer to the volume of the golf ball body is preferably 8 vol % or more, more preferably 10 vol % or more, even more preferably 11 vol % or more, and is preferably 20 vol % or less, more preferably 18 vol % or less, even more preferably 16 vol % or less. If the ratio is 8 vol % or more, the spin rate on driver shots decreases and the flight distance further increases, and if the ratio is 20 vol % or less, the shot feeling becomes better. It is noted that the volume of the golf ball body is a volume when assuming that there is no dimple formed on the surface of the golf ball.

(Tc)

The thickness Tc of the cover is preferably 0.3 mm or more, more preferably 0.4 mm or more, even more preferably 0.5 mm or more, and is preferably 0.8 mm or less, more preferably 0.7 mm or less, even more preferably 0.5 mm or less. If the thickness of the cover is 0.3 mm or more, the spin performance on approach shots becomes better, and if the thickness of the cover is 0.8 mm or less, the spin rate on driver shots decreases and the flight distance further increases.

(Tc×Mc)

The value (Tc×Mc) obtained by multiplying the thickness Tc (mm) of the cover and the 10% modulus Mc (kgf/cm$^2$) of the cover is preferably 2.0 or more, more preferably 3.0 or more, even more preferably 4.0 or more, and is preferably 26.0 or less, more preferably 24.0 or less, even more preferably 22.0 or less. If the value (Tc×Mc) is 2.0 or more, the spin performance on approach shots further improves, and if the value (Tc×Mc) is 26.0 or less, the spin rate on driver shots decreases and the flight distance further increases.

(Vc)

A ratio of the volume Vc of the cover to the volume of the golf ball body is preferably 3 vol % or more, more preferably 4 vol % or more, even more preferably 5 vol % or more, and is preferably less than 10 vol %, more preferably 9 vol % or less, even more preferably 8 vol % or less. If the ratio is 3 vol % or more, the spin performance on approach shots becomes better, and if the ratio is less than 10 vol %, the spin rate on driver shots decreases and the flight distance increases. It is noted that the volume of the golf ball body and the volume of the cover are a volume when assuming that there is no dimple formed on the surface of the golf ball.

When the golf ball of the present invention has a diameter in a range from 40 mm to 45 mm, a compression deformation amount (a shrinking amount of the golf ball in the compression direction thereof) of the golf ball when applying a load from an initial load of 98 N to a final load of 1275 N to the golf ball is preferably 2.0 mm or more, more preferably 2.2 mm or more, even more preferably 2.3 mm or more, most preferably 2.4 mm or more, and is preferably 4.0 mm or less, more preferably 3.7 mm or less. If the compression deformation amount is 2.0 mm or more, the golf ball does not become excessively hard, thus exhibits good shot feeling. On the other hand, if the compression deformation amount is 4.0 mm or less, the resilience is enhanced.

(Structure B)

Especially in the case of the structure B, the 10% modulus Mp (kgf/cm$^2$) of the paint film, the 10% modulus Mm (kgf/cm$^2$) of the intermediate layer, the 10% modulus Me (kgf/cm$^2$) of the envelope layer, the 10% modulus Mc (kgf/cm$^2$) of the cover, the thickness Tp (mm) of the paint film, the thickness Tm (mm) of the intermediate layer, the thickness Te (mm) of the envelope layer, the thickness Tc (mm) of the cover, and the molar ratio (NCO/OH) X of the isocyanate groups (NCO) in the polyisocyanates composition to the hydroxyl groups (OH) in the polyol composition satisfy the following requirements;

$Mm-Me>50$ $Me-Mc>55$ $Tm≥Te>Tc>Tp$ $(Tm×Mm)/(Te×Me)>1.8$ $(Te×Me)/(Tc×Mc)>8.0$ $(Tc×Mc)/(Tp×Mp)>2.4.$

The above requirements for the structure B may be satisfied in addition to the requirements prescribed for the structure A or independently from the requirements for the structure A.

Regarding the intermediate layer, envelope layer, cover and paint film of the golf ball of the present invention, it is designed that, nearer to the surface of the ball the position is, softer and thinner the layer is. By adopting such the configuration, the golf ball showing a high spin rate on approach shots and a low spin rate on driver shots can be obtained. In addition, Mp of the paint film is 100 kgf/cm$^2$ or less, and Mp and X satisfy the above relation. That is, the softness of the paint film is good even increasing the molar ratio (NCO/OH), thus the spin rate on approach shots is high and stain resistance is excellent.

(Mm−Me)

A difference (Mm−Me) between the 10% modulus Mm (kgf/cm$^2$) of the intermediate layer and the 10% modulus Me (kgf/cm$^2$) of the envelope layer is more than 50 kgf/cm$^2$ (4.9 Mpa), preferably more than 60 kgf/cm$^2$ (5.9 Mpa), and more preferably more than 70 kgf/cm$^2$ (6.9 Mpa). If the difference (Mm−Me) is 50 kgf/cm$^2$ or less, the spin rate on driver shots increases and the flight distance decreases, or the spin rate on approach shots decreases. The upper limit of the difference (Mm−Me) is not particularly limited, but generally 300 kgf/cm$^2$ (29.4 Mpa), preferably 270 kgf/cm$^2$ (26.5 Mpa), and more preferably 240 kgf/cm$^2$ (23.5 Mpa).

(Me−Mc)

A difference (Me−Mc) between the 10% modulus Me (kgf/cm$^2$) of the envelope layer and the 10% modulus Mc (kgf/cm$^2$) of the cover is more than 55 kgf/cm$^2$ (5.4 Mpa), preferably more than 65 kgf/cm$^2$ (6.4 Mpa), and more preferably more than 75 kgf/cm$^2$ (7.4 Mpa). If the difference (Me−Mc) is 55 kgf/cm$^2$ or less, the spin rate on driver shots increases and the flight distance decreases, or the spin rate on approach shots decreases. The upper limit of the difference (Me−Mc) is not particularly limited, but generally 170 kgf/cm$^2$ (16.7 Mpa), preferably 150 kgf/cm$^2$ (14.7 Mpa), and more preferably 130 kgf/cm$^2$ (12.7 Mpa).

(Tm≥Te>Tc>Tp)

The thickness Tm of the intermediate layer is larger than or equal to the thickness Te of the envelope layer (Tm≥Te), the thickness Te of the envelope layer is larger than the thickness Tc of the cover (Te>Tc), and the thickness Tc of the cover is larger than the thickness Tp of the paint film (Tc>Tp). If the thickness Tm of the intermediate layer is smaller than the thickness Te of the envelope layer, the thickness Te of the envelope layer is smaller than or equal to the thickness Tc of the cover, or the thickness Tc of the cover is smaller than or equal to the thickness Tp of the paint film, the spin rate on driver shots increases and the flight distance decreases, or the spin rate on approach shots decreases.

((Tm×Mm)/(Te×Me))

A ratio ((Tm×Mm)/(Te×Me)) of the value (Tm×Mm) obtained by multiplying the thickness Tm (mm) of the intermediate layer and the 10% modulus Mm (kgf/cm$^2$) of the intermediate layer to the value (Te×Me) obtained by multiplying the thickness Te (mm) of the envelope layer and the 10% modulus Me (kgf/cm$^2$) of the envelope layer, is more than 1.8, preferably more than 1.9, and more preferably more than 2.0. If the ratio ((Tm×Mm)/(Te×Me)) is 1.8 or less, the spin rate on driver shots increases and the flight distance decreases, or the spin rate on approach shots decreases. The upper limit of the ratio ((Tm×Mm)/(Te×Me)) is not particularly limited, but preferably 5.0 or less, more preferably 4.5 or less, and even more preferably 4.0 or less.

((Te×Me)/(Tc×Mc))

A ratio ((Te×Me)/(Tc×Mc)) of the value (Te×Me) obtained by multiplying the thickness Te (mm) of the envelope layer and the 10% modulus Me (kgf/cm$^2$) of the envelope layer to the value (Tc×Mc) obtained by multiplying the thickness Tc (mm) of the cover and the 10% modulus Mc (kgf/cm$^2$) of the cover, is more than 8.0, preferably more than 10.0, and more preferably more than 12.0. If the ratio ((Te×Me)/(Tc×Mc)) is 8.0 or less, the spin rate on driver shots increases and the flight distance decreases, or the spin rate on approach shots decreases. The upper limit of the ratio ((Te×Me)/(Tc×Mc)) is not particularly limited, but preferably 50.0 or less, more preferably 47.0 or less, and even more preferably 45.0 or less.

((Tc×Mc)/(Tp×Mp))

A ratio ((Tc×Mc)/(Tp×Mp)) of the value (Tc×Mc) obtained by multiplying the thickness Tc (mm) of the cover and the 10% modulus Mc (kgf/cm$^2$) of the cover to the value (Tp×Mp) obtained by multiplying the thickness Tp (mm) of the paint film and the 10% modulus Mp (kgf/cm$^2$) of the paint film, is more than 2.4, preferably more than 2.5, and more preferably more than 2.6. If the ratio ((Tc×Mc)/(Tp×Mp)) is 2.4 or less, the spin rate on driver shots increases and the flight distance decreases, or the spin rate on approach shots decreases. The upper limit of the ratio ((Tc×Mc)/(Tp×Mp)) is not particularly limited, but preferably 12.0 or less, more preferably 11.0 or less, and even more preferably 10.0 or less.

In addition, in the case of the structure B, the spherical core, intermediate layer, envelope layer and cover preferably satisfy the following requirements.

The spherical core preferably has a diameter of 37.0 mm or more, more preferably 37.5 mm or more, and even more preferably 38.5 mm or more. If the spherical core has a diameter of 37.0 mm or more, the resilience becomes better. The upper limit of the diameter of the spherical core is not particularly limited, but preferably 40.5 mm or less, more preferably 40.0 mm or less, and even more preferably 39.5 mm or less When the spherical core has a diameter ranging from 37.0 mm to 40.5 mm, a compression deformation amount (a shrinking amount of the core in the compression direction thereof) of the spherical core when applying a load from an initial load of 98 N to a final load of 1275 N to the spherical core is preferably 2.3 mm or more, more preferably 2.5 mm or more, and is preferably 4.5 mm or less, more preferably 4.2 mm or less. If the compression deformation amount is 2.3 mm or more, the shot feeling becomes better, and if the compression deformation amount is 4.5 mm or less, the resilience becomes better.

(Tm×Mm)

The value (Tm×Mm) obtained by multiplying the thickness Tm (mm) of the intermediate layer and the 10% modulus Mm (kgf/cm$^2$) of the intermediate layer is preferably 120 or more, more preferably 140 or more, even more preferably 160 or more, and is preferably 400 or less, more preferably 370 or less, even more preferably 340 or less. If the value (Tm×Mm) is 120 or more, the spin rate on driver shots decreases and the flight distance further increases, and if the value (Tm×Mm) is 400 or less, the spin performance on approach shots further improves.

(Vm)

A ratio of the volume Vm of the intermediate layer to the volume of the golf ball body is preferably 7.0 vol % or more, more preferably 8.0 vol % or more, even more preferably 9.0 vol % or more, and is preferably 18.0 vol % or less, more preferably 16.0 vol % or less, even more preferably 14.0 vol % or less. If the ratio is 7.0 vol % or more, the spin rate on driver shots decreases and the flight distance further increases, and if the ratio is 18.0 vol % or less, the spin rate on approach shots also increases. It is noted that the volume of the golf ball body is a volume when assuming that there is no dimple formed on the surface of the golf ball.

(Te)

The thickness Te of the envelope layer is preferably 0.5 mm or more, more preferably 0.6 mm or more, even more preferably 0.7 mm or more, and is preferably 1.2 mm or less, more preferably 1.0 mm or less, even more preferably 0.9 mm or less. If the thickness of the envelope layer is 0.5 mm or more, the durability of the golf ball improves, and if the thickness of the envelope layer is 1.2 mm or less, the spin rate on driver shots decreases and the flight distance further increases.

(Me)

The 10% modulus Me of the envelope layer is preferably 45 kgf/cm$^2$ (4.4 MPa) or more, more preferably 50 kgf/cm$^2$ (4.9 MPa) or more, and even more preferably 55 kgf/cm$^2$ (5.4 MPa) or more. If the 10% modulus of the envelope layer is 45 kgf/cm$^2$ or more, the spin rate on driver shots decreases and the flight distance further increases. The upper limit of the 10% modulus of the envelope layer is not particularly limited, but 150 kgf/cm$^2$ (14.7 MPa) is preferable, and 130 kgf/cm$^2$ (12.7 MPa) is more preferable.

(Te×Me)

The value (Te×Me) obtained by multiplying the thickness Te (mm) of the envelope layer and the 10% modulus Me (kgf/cm$^2$) of the envelope layer is preferably 30 or more, more preferably 40 or more, even more preferably 50 or more, and is preferably 140 or less, more preferably 130 or less, even more preferably 120 or less. If the value (Te×Me) is 30 or more, the spin rate on driver shots decreases and the flight distance further increases, and if the value (Te×Me) is 140 or less, the spin performance on approach shots improves.

(He)

The hardness of the envelope layer is preferably 42 or more, more preferably 45 or more, even more preferably 48 or more, and is preferably 61 or less, more preferably 59 or less, even more preferably 57 or less in Shore D hardness. If the hardness is 42 or more in Shore D hardness, the spin rate on driver shots decreases and the flight distance further increases. In addition, if the hardness is 61 or less in Shore D hardness, the spin rate on approach shots also increases. The hardness of the envelope layer is a slab hardness obtained by measuring the intermediate layer composition for forming the envelope layer molded into a sheet form.

(Ve)

A ratio of the volume Ve of the envelope layer to the volume of the golf ball body is preferably 6.0 vol % or more, more preferably 7.0 vol % or more, even more preferably 8.0 vol % or more, and is preferably 15.0 vol % or less, more preferably 14.0 vol % or less, even more preferably 13.0 vol % or less. If the ratio is 6.0 vol % or more, the spin rate on driver shots decreases and the flight distance further increases, and if the ratio is 15.0 vol % or less, the spin rate on approach shots also increases. It is noted that the volume of the golf ball body is a volume when assuming that there is no dimple formed on the surface of the golf ball.

(Tc)

The thickness Tc of the cover is preferably 0.1 mm or more, more preferably 0.2 mm or more, even more preferably 0.3 mm or more, and is preferably 0.6 mm or less, more preferably 0.5 mm or less, even more preferably 0.4 mm or less. If the thickness of the cover is 0.1 mm or more, the spin rate on approach shots further increases, and if the thickness of the cover is 0.6 mm or less, the spin rate on driver shots decreases and the flight distance further increases.

(Tc×Mc)

The value (Tc×Mc) obtained by multiplying the thickness Tc (mm) of the cover and the 10% modulus Mc (kgf/cm$^2$) of the cover is preferably 1.0 or more, more preferably 1.5 or more, even more preferably 2.0 or more, and is preferably 26.0 or less, more preferably 24.0 or less, even more preferably 22.0 or less. If the value (Tc×Mc) is 1.0 or more, the spin performance on approach shots further improves, and if the value (Tc×Mc) is 26.0 or less, the spin rate on driver shots decreases and the flight distance further increases.

(Vc)

A ratio of the volume Vc of the cover to the volume of the golf ball body is preferably 3.0 vol % or more, more preferably 3.5 vol % or more, even more preferably 4.0 vol % or more, and is preferably less than 10 vol %, more preferably 9.0 vol % or less, even more preferably 8.0 vol % or less. If the ratio is 3.0 vol % or more, the spin rate on approach shots increases, and if the ratio is less than 10 vol %, the spin rate on driver shots decreases and the flight distance increases. It is noted that the volume of the golf ball body and the volume of the cover are a volume when assuming that there is no dimple formed on the surface of the golf ball.

When the golf ball of the present invention has a diameter in a range from 40 mm to 45 mm, a compression deformation amount (a shrinking amount of the golf ball in the compression direction thereof) of the golf ball when applying a load from an initial load of 98 N to a final load of 1275 N to the golf ball is preferably 2.0 mm or more, more preferably 2.1 mm or more, even more preferably 2.2 mm or more, most preferably 2.3 mm or more, and is preferably 4.0 mm or less, more preferably 3.7 mm or less. If the compression deformation amount is 2.0 mm or more, the golf ball does not become excessively hard, thus exhibits good shot feeling. On the other hand, if the compression deformation amount is 4.0 mm or less, the resilience is enhanced.

Examples of the structure of the golf ball body include: a three-piece golf ball having a single layered core, an intermediate layer covering the single layered core, and a cover covering the intermediate layer; a four-piece golf ball having a two layered core, an intermediate layer covering the two layered core, and a cover covering the intermediate layer; a four-piece golf ball having a single layered core, an intermediate layer covering the single layered core, an envelope layer covering the intermediate layer, and a cover covering the envelope layer; and a five-piece golf ball having a two layered core, an intermediate layer covering the two layered core, an envelope layer covering the intermediate layer, and a cover covering the envelope layer.

FIG. 1 is a partially cutaway sectional view showing the golf ball 1 according to one embodiment of the present invention. The golf ball 1 comprises a spherical core 2 consisting of a spherical inner core 21 and an outer core 22 disposed outside the inner core 21, an intermediate layer 3 disposed outside the spherical core 2, a reinforcing layer 4 disposed outside the intermediate layer, a cover 5 disposed outside the reinforcing layer 4, and a paint film 6 formed on the surface of the cover 5. A plurality of dimples 51 are formed on the surface of the cover 5. Other portions than dimples 51 on the surface of the cover 5 are land 52.

Figure 2:
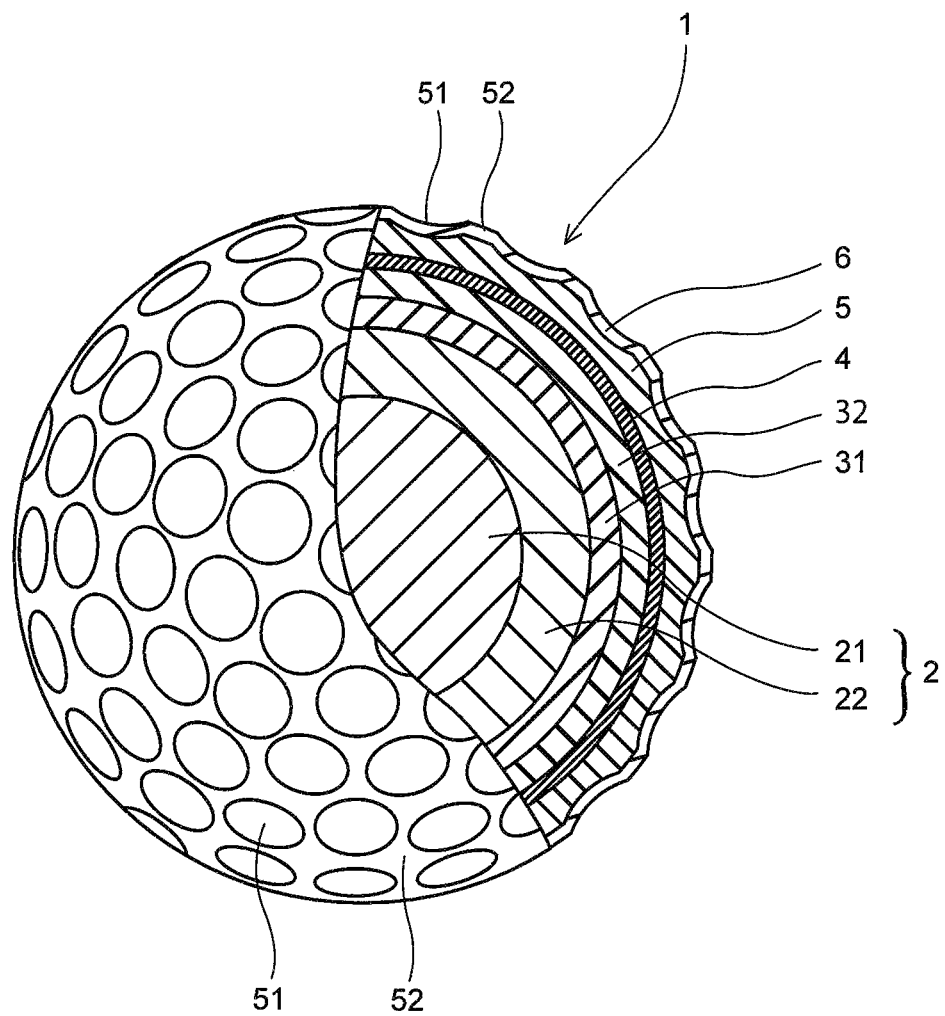
FIG. 2 is a partially cutaway sectional view showing the golf ball according to another embodiment of the present invention.

FIG. 2 is a partially cutaway sectional view showing the golf ball 1 according to another embodiment of the present invention. The golf ball 1 comprises a spherical core 2 consisting of a spherical inner core 21 and an outer core 22 disposed outside the inner core 21, an intermediate layer 3 disposed outside the spherical core 2, an envelope layer 32 disposed outside the intermediate layer, a reinforcing layer 4 disposed outside the envelope layer, a cover 5 disposed outside the reinforcing layer 4, and a paint film 6 formed on the surface of the cover 5. A plurality of dimples 51 are formed on the surface of the cover 5. Other portions than dimples 51 on the surface of the cover 5 are land 52.

EXAMPLES

Hereinafter, the present invention will be described in detail by way of example. The present invention is not limited to examples described below. Various changes and modifications can be made without departing from the spirit and scope of the present invention.

[Evaluation Method]

(1) Slab Hardness (Shore D Hardness)

A sheet with a thickness of about 2 mm was produced by injection molding the cover composition or the intermediate layer composition, and stored at 23° C. for two weeks. Three or more of these sheets were stacked on one another so as not to be affected by the measuring substrate on which the sheets were placed, and the hardness of the stack was measured with a type P1 auto loading durometer manufactured by Kobunshi Keiki Co., Ltd., provided with a Shore D type spring hardness tester prescribed in ASTM-D2240.

(2) Core Hardness (JIS-C Hardness)

A type P1 auto loading durometer manufactured by Kobunshi Keiki Co., Ltd., provided with a JIS-C type spring hardness tester was used to measure the hardness of the core. The JIS-C hardness measured at the core surface was adopted as the surface hardness of the core. The core was cut into two hemispheres, and the JIS-C hardness measured at the central point of the cut plane was adopted as the center hardness of the core.

(3) Compression Deformation Amount (Mm)

The compression deformation amount of the golf ball (shrinking amount of the golf ball in the compression direction thereof), when applying a load from an initial load of 98 N to a final load of 1275 N to the golf ball, was measured.

(4) Mechanical Properties of Cover, Intermediate Layer and Envelope Layer

A sheet with a thickness of about 2 mm was prepared by injection molding the cover composition, the intermediate layer composition or the envelope layer composition, and stored at 23° C. for two weeks. According to ISO 527-1, a dumbbell-shape test piece (distance between marked lines: 73 mm, width of parallel part: 5.0 mm) was prepared from the sheet, the mechanical properties of the test piece were measured using a tensile tester (tension speed: 100 mm/min, measurement temperature: 23° C.) manufactured by Shimadzu Corporation, and the modulus (tension elastic modulus) at 10% elongation was calculated.

(5) Mechanical Properties of Paint Film

The main agent and curing agent were blended to prepare a paint. The obtained paint was dried and cured at 40° C. for 4 hours to prepare a paint film. According to JIS-K7161, this paint film was punched out in a dumbbell shape (distance between marked lines: 20 mm, width of parallel part: 10 mm) to prepare a test piece, the mechanical properties of the test piece were measured using a tensile tester manufactured by Shimadzu Corporation, and the modulus (tension elastic modulus) at 10% elongation was calculated.

Thickness of test piece: 0.05 mm
Tension speed: 50 mm/min
Measurement temperature: 23° C.

(6) Coefficient of Restitution

A 198.4 g of metal cylindrical object was allowed to collide with each golf ball at a speed of 45 m/sec, and the speeds of the cylindrical object and the golf ball before and after the collision were measured. Based on these speeds and the mass of each object, coefficient of restitution for each golf ball was calculated. The measurement was conducted by using twelve samples for each golf ball, and the average value was regarded as coefficient of restitution for the golf ball. Coefficient of restitution of the golf ball No. 1 was defined as an index of 100, and coefficient of restitution of each golf ball is represented by converting coefficient of restitution of each golf ball into this index.

(7) Flight Distance (m) and Spin Rate (Rpm) on Driver Shots

A driver provided with a titanium head (XXIO, Shaft: S, loft: 10.0°, manufactured by Dunlop Sports Limited) was installed on a swing machine manufactured by True Temper Sports, Inc. The golf ball was hit at a head speed of 45 m/sec, and the spin rate right after hitting the golf ball, and the flight distance (the distance from the launch point to the stop point) were measured. This measurement was conducted ten times for each golf ball, and the average value thereof was adopted as the measurement value for the golf ball. A sequence of photographs of the hit golf ball were taken for measuring the spin rate right after hitting the golf ball.

(8) Spin Rate on Approach Shots

A sand wedge (CG15 forged wedge (58°), manufactured by Cleveland Golf) was installed on a swing machine manufactured by True Temper Sports, Inc. The golf ball was hit at a head speed of 10 m/sec, and the spin rate (rpm) was measured by taking a sequence of photographs of the hit golf ball. This measurement was conducted ten times for each golf ball, and the average value thereof was adopted as the spin rate.

(9) Shot Feeling

An actual hitting test was carried out by ten amateur golfers (high skilled persons) using a sand wedge (CG 15 forged wedge (52°) available from Cleveland Golf). In accordance with the number who answered the shot feeling was good (feeling like that the golf ball was lifted on the club face, feeling like that the golf ball gripped on the club surface, feeling like that the spin was imparted, feeling like that the golf ball was stuck on the club face, etc.), the golf balls were evaluated as follows.

E (Excellent): 8 or more
G (Good): 4 to 7
P (Poor): 3 or less

(10) Stain Resistance

The golf ball was immersed for 30 seconds in an aqueous solution of tincture of iodine which was obtained by diluting a tincture of iodine (an ethanol solution containing 6 mass % of iodine and 4 mass % of potassium iodide) to 40 times, and then taken out. After the extra aqueous solution of tincture of iodine adhered on the surface of the golf ball was wipe off, color tones (L, a, b) of the golf ball before and after the immersion were measured by using a color difference meter (CM3500D manufactured by Konica Minolta Inc.), and a color difference ($\Delta E$) was calculated according to the following equation. The larger the value of the color difference ($\Delta E$) is, the larger the extent of color changing is.

$$\Delta E = [(\Delta L)^2 + (\Delta a)^2 + (\Delta b)^2]^{1/2}$$

Evaluation Standard
 E (Excellent): $\Delta E$ is 15 or less
 G (Good): $\Delta E$ is more than 15 and 20 or less
 P (Poor): $\Delta E$ is more than 20 and less than 25
 VP (Very poor): $\Delta E$ is 25 or more

[Preparation of Golf Ball]

1. Preparation of Core

The rubber composition having a formulation shown in Table 1 was kneaded and heat-molded in upper and lower molds, each having a hemispherical cavity, at the conditions shown in Table 2 to obtain the inner core. Next, the rubber composition having a formulation shown in Table 1 was kneaded and molded into half shells using the mold for forming half shells. The inner core obtained above was covered concentrically with two half shells. The inner core and two half shells were heat-pressed in upper and lower molds, each having a hemispherical cavity, at the conditions shown in Table 2 to obtain the spherical core. The amount of barium sulfate was adjusted such that the finally obtained golf ball had a mass of 45.6 g.

TABLE 1

| Rubber composition No. | | a | b | c | d | e |
|---|---|---|---|---|---|---|
| Formulation (parts by | Polybutadiene rubber | 100 | 100 | 100 | 100 | 100 |
| | Zinc acrylate | 23 | 32 | 33 | 34 | 30 |
| | Zinc oxide | 5 | 5 | 5 | 5 | 5 |
| | Barium sulfate | *1) | *1) | *1) | *1) | *1) |
| | 2-Thionaphthol | 0.2 | 0.2 | 0.2 | 0.2 | 0.2 |
| | Dicumyl peroxide | 0.8 | 0.8 | 0.8 | 0.8 | 0.8 |
| | Zinc octylate | 2 | 2 | 2 | 2 | — |

*1) The amount of barium sulfate was adjusted such that the finally obtained golf ball had a mass of 45.6 g.

Polybutadiene rubber: "BR730 (high cis-polybutadiene)" manufactured by JSR Corporation
Zinc acrylate: "Sanceler (registered trademark) SR" (product of 10 mass % stearic acid coating)" manufactured by Sanshin Chemical Industry Co., Ltd.
Zinc oxide: "Ginrei R" manufactured by Toho-Zinc Co.
Barium sulfate: "Barium Sulfate BD" manufactured by Sakai Chemical Industry Co., Ltd.
2-Thionaphthol: manufactured by Tokyo Chemical Industry Co., Ltd.
Dicumyl peroxide: "Percumyl (register trademark) D" manufactured by NOF Corporation
Zinc octylate: manufactured by Mitsuwa Chemicals Co., Ltd

TABLE 2

| | Core No. | I | II | III | IV | V | VI | VII | VIII | IX |
|---|---|---|---|---|---|---|---|---|---|---|
| Inner layer | Rubber composition No. | a | a | a | a | a | a | a | a | a |
| | Heating Temperature conditions (° C.) | 150 | 150 | 150 | 150 | 150 | 150 | 150 | 150 | 150 |
| | Time (min) | 20 | 20 | 20 | 20 | 20 | 20 | 20 | 20 | 20 |
| | Diameter (mm) | 15 | 15 | 15 | 15 | 15 | 15 | 15 | 15 | 15 |

TABLE 2-continued

| | Core No. | I | II | III | IV | V | VI | VII | VIII | IX |
|---|---|---|---|---|---|---|---|---|---|---|
| Outer layer | Rubber composition No. | b | c | d | e | b | c | d | b | e |
| | Heating conditions Temperature (° C.) | 150 | 150 | 150 | 150 | 150 | 150 | 150 | 150 | 150 |
| | Time (min) | 20 | 20 | 20 | 20 | 20 | 20 | 20 | 20 | 20 |
| | Diameter (mm) | 39.7 | 39.7 | 39.1 | 39.7 | 38.5 | 38.5 | 37.5 | 38.1 | 38.5 |
| Center hardness (JIS-C) | | 55 | 55 | 55 | 55 | 55 | 55 | 55 | 55 | 55 |
| Surface hardness (JIS-C) | | 86 | 85 | 90 | 83 | 86 | 85 | 90 | 86 | 83 |
| Hardness difference (Surface - Center) (JIS-C) | | 31 | 30 | 35 | 28 | 31 | 30 | 35 | 31 | 28 |

2. Preparation of Intermediate Layer Composition and Cover Composition

The material having a formulation shown in Tables 3 or 4 was mixed using a twin-screw kneading extruder to obtain the intermediate layer composition or the cover composition in a pellet form. The extrusion was conducted in the following conditions: screw diameter=45 mm, screw revolution=200 rpm, and screw L/D=35. The blended material was heated to 160° C. to 230° C. at the die position of the extruder.

Himilan AM7337: Sodium ion neutralized ethylene-methacrylic acid copolymer ionomer resin manufactured by Du Pont-Mitsui Polychemicals Co., Ltd Himilan AM7329: Zinc ion neutralized ethylene-methacrylic acid copolymer ionomer resin manufactured by Du Pont-Mitsui Polychemicals Co., Ltd Nucrel N1050H: Ethylene-methacrylic acid copolymer manufactured by Du Pont-Mitsui Polychemicals Co., Ltd Rabalon T3221C: Styrene elastomer manufactured by Mitsubishi Chemical Corporation

TABLE 4

| Cover composition No. | A | B | C | D | E | F | G | H | I |
|---|---|---|---|---|---|---|---|---|---|
| Elastollan NY75A | 100 | — | — | — | — | — | — | — | — |
| Elastollan NY82A | — | 100 | — | — | — | — | — | — | — |
| Elastollan NY88A | — | — | 100 | — | 15 | 20 | 35 | 38 | 40 |
| Elastollan NY95A | — | — | — | 100 | 85 | 80 | 65 | 62 | 60 |
| Tinuvin 770 | 0.2 | 0.2 | 0.2 | 0.2 | 0.2 | 0.2 | 0.2 | 0.2 | 0.2 |
| Titanium oxide | 4 | 4 | 4 | 4 | 4 | 4 | 4 | 4 | 4 |
| Ultramarine blue | 0.04 | 0.04 | 0.04 | 0.04 | 0.04 | 0.04 | 0.04 | 0.04 | 0.04 |
| Slab hardness (Shore D) | 10 | 29 | 36 | 50 | 48 | 47 | 44 | 43 | 42 |
| 10% modulus (kgf/cm$^2$) | 8.7 | 11 | 18 | 55 | 49 | 45 | 38 | 35 | 32 |

TABLE 3

| Intermediate layer composition No. | a | b | c | d | e | f | g | h | i | j | k |
|---|---|---|---|---|---|---|---|---|---|---|---|
| Surlyn 8150 | 50 | 50 | 32.5 | — | — | — | 50 | — | — | — | — |
| Surlyn 9150 | — | 50 | 32.5 | — | — | — | 50 | — | — | — | — |
| Polyamide 6 | — | — | 35 | — | — | — | — | — | — | — | — |
| Himilan AM7337 | — | — | — | 55 | 31.5 | 55 | — | 55 | 30 | 48 | 46 |
| Himilan AM7329 | 50 | — | — | 45 | 38.5 | 42 | — | 42 | 30 | 30 | 30 |
| Nucrel N1050H | — | — | — | — | 16 | — | 16 | 16 | 16 | 16 | 16 |
| Rabalon T3221C | — | — | — | — | 14 | 3 | — | — | 24 | 6 | 8 |
| Titanium oxide | 3 | 3 | 3 | 3 | 3 | 3 | 3 | 3 | 3 | 3 | 3 |
| Slab hardness (Shore D) | 68 | 70 | 72 | 65 | 55 | 62 | 64 | 62 | 48 | 59 | 58 |
| 10% modulus (kgf/cm$^2$) | 202 | 227 | 308 | 176 | 108 | 148 | 165 | 148 | 80 | 135 | 129 |

Surlyn 8150: Sodium ion neutralized ethylene-methacrylic acid copolymer ionomer resin manufactured by E. I. du Pont de Nemours and Company Surlyn 9150: Zinc ion neutralized ethylene-methacrylic acid copolymer ionomer resin manufactured by E. I. du Pont de Nemours and Company Polyamide 6: manufactured by Toray Industries, Inc.

Elastollan XNY75A: Thermoplastic polyurethane elastomer manufactured by BASF Japan Co.

Elastollan XNY82A: Thermoplastic polyurethane elastomer manufactured by BAF Japan Co.

Elastollan XNY88A: Thermoplastic polyurethane elastomer manufactured by BASF Japan Co.

Elastollan XNY95A: Thermoplastic polyurethane elastomer manufactured by BASF Japan Co.

Tinuvin 770: Hindered amine light stabilizer manufactured by BASF Japan Co.

3. Molding of Intermediate Layer

The intermediate layer composition obtained above was injection molded directly on the spherical core obtained as described above to produce the intermediate layer covering the spherical core. Further, the intermediate layer composition obtained above was injection molded directly on the intermediate to produce the envelope layer covering the intermediate layer. Upper and lower molds for molding have a semispherical cavity and a hold pin which is retractable and can hold the spherical body. When molding the intermediate layer or envelope layer, the hold pin was protruded to hold the spherical core or the spherical core on which the intermediate layer was formed, the intermediate layer composition was charged into the mold and cooled, and the spherical body was taken out from the mold.

The reinforcing layer composition ("Polyn 750 LE" available from SHINTO PAINT Co., Ltd.) containing a two-component curing type epoxy resin as a base resin was prepared. The base agent contains 30 parts by mass of a bisphenol A type epoxy resin and 70 parts by mass of a solvent. The curing agent contains 40 parts by mass of a modified polyamide amine, 5 parts by mass of titanium oxide, and 55 parts by mass of a solvent. The mass ratio of the base agent and the curing agent was set to 1/1. The reinforcing layer composition was applied with a spray gun to the surface of the spherical body on which the intermediate layer is covered, and kept at the atmosphere of 23° C. for 12 hours to obtain the reinforcing layer. The thickness of the reinforcing layer was 7 μm.

5. Molding of Cover

The cover composition in a pellet form was charged into each concave portion of the lower mold of the mold for molding half shells, and the half shells were molded by performing compression. Compression molding was conducted at the molding temperature of 170° C. for 5 minutes under the molding pressure of 2.94 MPa. The spherical body on which the intermediate layer and the reinforcing layer were formed was covered concentrically with two half shells. The spherical body and half shells were charged into the final mold having a plurality of pimples on the cavity surface, and the cover was molded by compression molding. Compression molding was conducted at the molding temperature of 145° C. for 2 minutes under the molding pressure of 9.8 MPa. A plurality of dimples having a shape which is the reversed shape of the pimples were formed on the cover.

6. Preparation of Paint

Preparation of Base Agent

As a polyol component, polytetramethylene ether glycol (PTMG) and trimethylolpropane (TMP) were dissolved in a solvent (toluene and methyl ethyl ketone). Then, dibutyl tin laurate which was used as a catalyst was added therein in an amount of 0.1 mass % with respect to the total amount of the base agent. While keeping the temperature of the obtained polyol solution at 80° C., isophorone diisocyanate (IPDI) which was used as a polyisocyanate component was added dropwise to the polyol solution and mixed. After adding of isophorone diisocyanate was finished, stirring was continued until the polyisocyanate component no longer existed. Then, the reaction liquid was cooled at the room temperature to obtain the urethane polyol (solid content: 30 mass %). The compositions of the obtained urethane polyols are shown in Table 5.

TABLE 5

| Urethane polyol No. | 1 | 2 | 3 | 4 | 5 |
|---|---|---|---|---|---|
| Polyol component | PTMG TMP | PTMG TMP | PTMG TMP | PTMG TMP | PTMG TMP |
| Polyisocyanate component | IPDI | IPDI | IPDI | IPDI | IPDI |

TABLE 5-continued

| Urethane polyol No. | 1 | 2 | 3 | 4 | 5 |
|---|---|---|---|---|---|
| Number average molecular weight of PTMG | 650 | 800 | 1000 | 1500 | 2000 |
| TMP:PTMG (molar ratio) | 1.8:1.0 | 1.8:1.0 | 1.8:1.0 | 1.8:1.0 | 1.8:1.0 |
| Molar ratio (NCO/OH) of NCO group of polyisocyanate component to OH group of polyol component | 0.6 | 0.6 | 0.6 | 0.6 | 0.6 |
| Content of PTMG (mass %) | 67 | 71 | 76 | 82 | 86 |
| Hydroxyl value of solid component (mgKOH/g) | 67.4 | 58.3 | 49.5 | 35.9 | 28.2 |
| Weight average molecular weight | 4867 | 5620 | 6624 | 9135 | 11646 |

Preparation of Curing Agent 30 parts by mass of an isocyanurate-modified product of hexamethylene diisocyanate (Duranate (registered trademark) TKA-100 (NCO content: 21.7 mass %) available from Asahi Kasei Chemicals Corporation), 30 parts by mass of a biuret-modified product of hexamethylene diisocyanate (Duranate 21S-75E (NCO content: 15.5 mass %) available from Asahi Kasei Chemicals Corporation), and 40 parts by mass of isophorone diisocyanate (Desmodur (registered trademark) Z 4470 (NCO content: 11.9 mass %) available from Bayer company) were mixed. As a solvent, a mixed solvent of methyl ethyl ketone, n-butyl acetate and toluene was added therein to adjust the concentration of the polyisocyanate component as 60 mass %.

Preparation of Paint

The curing agent was blended into the base agent prepared above in a NCO/OH ratio shown in Tables 6 to 11, to prepare the paint.

7. Formation of Paint Film

The surface of the golf ball body obtained above was subjected to the sandblast treatment, and the mark was formed thereon. Then, the paint was applied to the golf ball body with the spray gun, and the paint was dried in the oven heated at 40° C. for 24 hours to prepare the golf ball having a diameter of 42.7 mm and a mass of 45.6 g. The thickness of the paint film was 20 μm. Application of the paint was conducted as follows. The golf ball body was placed in the rotating member provided with prongs which rotated at 300 rpm. Application of the paint was conducted by spacing a spray distance (7 cm) between the air gun and the golf ball body while moving the air gun in up and down direction. The painting interval in the overpainting operation was set to 1.0 second. Application of the paint was conducted under the spraying conditions of overpainting operation: twice, spraying air pressure: 0.15 MPa, compressed air tank pressure: 0.10 MPa, painting time per one application: 1 second, atmosphere temperature: 20° C. to 27° C., and atmosphere humidity: 65% or less.

The evaluation results regarding the obtained golf balls are shown in Tables 6 to 11.

TABLE 6

| | Golf ball No. | 1 | 2 | 3 | 4 | 5 | 6 | 7 | 8 | 9 | 10 | 11 | 12 | 13 |
|---|---|---|---|---|---|---|---|---|---|---|---|---|---|---|
| Core | No. | I | I | II | I | I | I | I | I | III | IV | I | I | I |
| | Diameter (mm) | 39.7 | 39.7 | 39.7 | 39.7 | 39.7 | 39.7 | 39.7 | 39.7 | 39.1 | 39.7 | 39.7 | 39.7 | 39.7 |
| | Center hardness (JIS-C) | 55 | 55 | 55 | 55 | 55 | 55 | 55 | 55 | 55 | 55 | 55 | 55 | 55 |
| | Surface hardness (JIS-C) | 86 | 86 | 85 | 86 | 86 | 86 | 86 | 86 | 90 | 83 | 86 | 86 | 86 |
| | Hardness difference (JIS-C) | 31 | 31 | 30 | 31 | 31 | 31 | 31 | 31 | 35 | 28 | 31 | 31 | 31 |
| Intermediate layer | Intermediate layer composition No. | a | b | c | d | e | a | a | a | a | a | a | a | a |
| | 10% modulus Mm (kgf/cm$^2$) | 202 | 227 | 308 | 176 | 108 | 202 | 202 | 202 | 202 | 202 | 202 | 202 | 202 |
| | Thickness Tm (mm) | 1.0 | 1.0 | 1.0 | 1.0 | 1.0 | 1.0 | 1.0 | 1.0 | 0.8 | 1.0 | 1.0 | 1.0 | 1.0 |
| | Volume ratio Vm (vol %) | 12.8 | 12.8 | 12.8 | 12.8 | 12.8 | 12.8 | 12.8 | 12.8 | 9.8 | 12.8 | 12.8 | 12.8 | 12.8 |

TABLE 6-continued

| | Golf ball No. | 1 | 2 | 3 | 4 | 5 | 6 | 7 | 8 | 9 | 10 | 11 | 12 | 13 |
|---|---|---|---|---|---|---|---|---|---|---|---|---|---|---|
| Cover | Cover composition No. | B | B | B | B | B | A | C | D | B | B | B | B | B |
| | 10% modulus Mc (kgf/cm²) | 11 | 11 | 11 | 11 | 11 | 8.7 | 18 | 55 | 11 | 11 | 11 | 11 | 11 |
| | Thickness Tc (mm) | 0.5 | 0.5 | 0.5 | 0.5 | 0.5 | 0.5 | 0.5 | 0.5 | 1.0 | 0.5 | 0.5 | 0.5 | 0.5 |
| | Volume ratio Vc (vol %) | 6.9 | 6.9 | 6.9 | 6.9 | 6.9 | 6.9 | 6.9 | 6.9 | 13.4 | 6.9 | 6.9 | 6.9 | 6.9 |
| Paint | Base agent Urethane polyol No. | 3 | 3 | 3 | 3 | 3 | 3 | 3 | 3 | 3 | 3 | 3 | 3 | 3 |
| | Number average molecular weight of PTMG | 1000 | 1000 | 1000 | 1000 | 1000 | 1000 | 1000 | 1000 | 1000 | 1000 | 1000 | 1000 | 1000 |
| | Curing agent/Base agent (NCO/OH molar ratio) | 0.85 | 0.85 | 0.85 | 0.85 | 0.85 | 0.85 | 0.85 | 0.85 | 0.85 | 0.85 | 1.23 | 1.39 | 0.80 |
| Paint Film | 10% modulus Mp (kgf/cm²) | 50 | 50 | 50 | 50 | 50 | 50 | 50 | 50 | 50 | 50 | 100 | 122 | 44 |
| | Thickness Tp (mm) | 0.02 | 0.02 | 0.02 | 0.02 | 0.02 | 0.02 | 0.02 | 0.02 | 0.02 | 0.02 | 0.02 | 0.02 | 0.02 |
| | 200 × [NCO/OH] − 75 | 95 | 95 | 95 | 95 | 95 | 95 | 95 | 95 | 95 | 95 | 171 | 203 | 85 |
| Absolute value of difference (\|Mp − Mc\|) (kgf/cm²) | | 39 | 39 | 39 | 39 | 39 | 41 | 32 | 5 | 39 | 39 | 89 | 111 | 33 |
| Difference (Mm − Mc) (kgf/cm²) | | 191 | 216 | 297 | 165 | 97 | 193 | 184 | 147 | 191 | 191 | 191 | 191 | 191 |
| (Tm × Mm)/(Tc × Mc) | | 36.7 | 41.3 | 56.0 | 32.0 | 19.6 | 46.4 | 22.4 | 7.3 | 14.7 | 36.7 | 36.7 | 36.7 | 36.7 |
| (Tc × Mc)/(Tp × Mp) | | 5.50 | 5.5 | 5.5 | 5.5 | 5.5 | 4.4 | 9.0 | 27.5 | 11.0 | 5.5 | 2.8 | 2.3 | 6.3 |
| Evaluation | Compression deformation amount (mm) | 2.5 | 2.4 | 2.4 | 2.5 | 2.6 | 2.5 | 2.5 | 2.5 | 2.5 | 2.5 | 2.5 | 2.5 | 2.5 |
| | Coefficient of restitution | 100 | 102 | 104 | 99 | 98 | 100 | 100 | 100 | 97 | 100 | 100 | 100 | 100 |
| | Driver shots: spin rate (rpm) | 2700 | 2650 | 2600 | 2750 | 2800 | 2800 | 2650 | 2550 | 2950 | 2800 | 2700 | 2700 | 2700 |
| | Driver shots: flight distance (m) | 250 | 252 | 254 | 249 | 246 | 248 | 251 | 253 | 240 | 248 | 250 | 250 | 250 |
| | Approach shots: spin rate (rpm) | 3550 | 3500 | 3450 | 3550 | 3600 | 3700 | 3500 | 3250 | 3800 | 3550 | 3450 | 3350 | 3580 |
| | Shot feeling | G | G | G | G | G | E | G | P | E | G | G | P | E |
| | Stain resistance | G | G | G | G | G | G | G | G | G | G | G | G | G |

TABLE 7

| | Golf ball No. | 14 | 15 | 16 | 17 | 18 | 19 | 20 | 21 | 22 | 23 | 24 | 25 |
|---|---|---|---|---|---|---|---|---|---|---|---|---|---|
| Core | No. | I | I | I | I | I | I | I | I | I | I | I | I |
| | Diameter (mm) | 39.7 | 39.7 | 39.7 | 39.7 | 39.7 | 39.7 | 39.7 | 39.7 | 39.7 | 39.7 | 39.7 | 39.7 |
| | Center hardness (JIS-C) | 55 | 55 | 55 | 55 | 55 | 55 | 55 | 55 | 55 | 55 | 55 | 55 |
| | Surface hardness (JIS-C) | 86 | 86 | 86 | 86 | 86 | 86 | 86 | 86 | 86 | 86 | 86 | 86 |
| | Hardness difference (JIS-C) | 31 | 31 | 31 | 31 | 31 | 31 | 31 | 31 | 31 | 31 | 31 | 31 |
| Intermediate layer | Intermediate layer composition No. | a | a | a | a | a | a | d | F | F | e | a | a |
| | 10% modulus Mm (kgf/cm²) | 202 | 202 | 202 | 202 | 202 | 202 | 176 | 148 | 148 | 108 | 202 | 202 |
| | Thickness Tm (mm) | 1.0 | 1.0 | 1.0 | 1.0 | 1.0 | 1.0 | 1.0 | 1.0 | 1.1 | 1.1 | 1.1 | 1.1 |
| | Volume ratio Vm (vol %) | 12.8 | 12.8 | 12.8 | 12.8 | 12.8 | 12.8 | 12.8 | 12.8 | 14.1 | 14.1 | 14.1 | 14.1 |
| Cover | Cover composition No. | B | B | B | B | B | E | F | G | D | F | B | A |
| | 10% modulus Mc (kgf/cm²) | 11 | 11 | 11 | 11 | 11 | 49 | 45 | 38 | 55 | 45 | 11 | 8.7 |
| | Thickness Tc (mm) | 0.5 | 0.5 | 0.5 | 0.5 | 0.5 | 0.5 | 0.5 | 0.5 | 0.4 | 0.4 | 0.4 | 0.4 |
| | Volume ratio Vc (vol %) | 6.9 | 6.9 | 6.9 | 6.9 | 6.9 | 6.9 | 6.9 | 6.9 | 5.5 | 5.5 | 5.5 | 5.5 |
| Paint | Base agent Urethane polyol No. | 4 | 1 | 2 | 4 | 5 | 3 | 3 | 3 | 3 | 3 | 3 | 3 |
| | Number average molecular weight of PTMG | 1500 | 650 | 800 | 1500 | 2000 | 1000 | 1000 | 1000 | 1000 | 1000 | 1000 | 1000 |
| | Curing agent/Base agent (NCO/OH molar ratio) | 0.80 | 0.54 | 0.68 | 1.06 | 1.64 | 0.85 | 0.85 | 0.85 | 0.85 | 0.85 | 1.23 | 1.05 |
| Paint film | 10% modulus Mp (kgf/cm²) | 29 | 50 | 50 | 50 | 50 | 50 | 50 | 50 | 50 | 50 | 100 | 75 |
| | Thickness Tp (mm) | 0.02 | 0.02 | 0.02 | 0.02 | 0.02 | 0.02 | 0.02 | 0.02 | 0.02 | 0.02 | 0.02 | 0.02 |
| | 200 × [NCO/OH] − 75 | 85 | 33 | 61 | 137 | 253 | 95 | 95 | 95 | 95 | 95 | 171 | 135 |
| Absolute value of difference (\|Mp − Mc\|) (kgf/cm²) | | 18 | 39 | 39 | 39 | 39 | 1 | 5 | 12 | 5 | 5 | 89 | 66 |
| Difference (Mm − Mc) (kgf/cm²) | | 191 | 191 | 191 | 191 | 191 | 153 | 131 | 110 | 93 | 63 | 191 | 193 |
| (Tm × Mm)/(Tc × Mc) | | 36.7 | 36.7 | 36.7 | 36.7 | 36.7 | 8.2 | 7.8 | 7.8 | 7.4 | 6.6 | 50.5 | 63.9 |
| (Tc × Mc)/(Tp × Mp) | | 9.5 | 5.5 | 5.5 | 5.5 | 5.5 | 24.5 | 22.5 | 19.0 | 22.0 | 18.0 | 2.2 | 2.3 |
| Evaluation | Compression deformation amount (mm) | 2.5 | 2.5 | 2.5 | 2.5 | 2.5 | 2.5 | 2.5 | 2.5 | 2.5 | 2.6 | 2.5 | 2.5 |
| | Coefficient of restitution | 100 | 100 | 100 | 100 | 100 | 100 | 100 | 99 | 99 | 98 | 101 | 101 |
| | Driver shots: spin rate (rpm) | 2700 | 2700 | 2700 | 2700 | 2700 | 2600 | 2650 | 2750 | 2500 | 2750 | 2600 | 2700 |
| | Driver shots: flight distance (m) | 250 | 250 | 250 | 250 | 250 | 252 | 250 | 248 | 252 | 247 | 252 | 251 |
| | Approach shots: spin rate (rpm) | 3620 | 3500 | 3530 | 3570 | 3590 | 3400 | 3450 | 3500 | 3200 | 3350 | 3300 | 3350 |
| | Shot feeling | E | G | G | G | G | G | G | G | P | P | P | P |
| | Stain resistance | G | VP | G | E | E | G | G | G | G | G | G | G |

TABLE 8

| | Golf ball No. | 26 | 27 | 28 | 29 | 30 | 31 | 32 | 33 |
|---|---|---|---|---|---|---|---|---|---|
| Core | No. | V | V | VI | V | V | V | V | V |
| | Diameter (mm) | 38.5 | 38.5 | 38.5 | 38.5 | 38.5 | 38.5 | 38.5 | 38.5 |

TABLE 8-continued

| | Golf ball No. | 26 | 27 | 28 | 29 | 30 | 31 | 32 | 33 |
|---|---|---|---|---|---|---|---|---|---|
| | Center hardness (JIS-C) | 55 | 55 | 55 | 55 | 55 | 55 | 55 | 55 |
| | Surface hardness (JIS-C) | 86 | 86 | 85 | 86 | 86 | 86 | 86 | 86 |
| | Hardness difference (JIS-C) | 31 | 31 | 30 | 31 | 31 | 31 | 31 | 31 |
| Intermediate layer | Intermediate layer composition No. | a | b | c | d | e | a | a | a |
| | 10% modulus Mm (kgf/cm$^2$) | 202 | 227 | 308 | 176 | 108 | 202 | 202 | 202 |
| | Thickness Tm (mm) | 1.0 | 1.0 | 1.0 | 1.0 | 1.0 | 1.0 | 1.0 | 1.0 |
| | Volume ratio Vm (vol %) | 12.0 | 12.0 | 12.0 | 12.0 | 12.0 | 12.0 | 12.0 | 12.0 |
| Envelope layer | Intermediate layer composition No. | e | e | e | e | e | e | e | e |
| | 10% modulus Me (kgf/cm$^2$) | 108 | 108 | 108 | 108 | 108 | 108 | 108 | 108 |
| | Thickness Te (mm) | 0.8 | 0.8 | 0.8 | 0.8 | 0.8 | 0.8 | 0.8 | 0.8 |
| | Volume ratio Ve (vol %) | 10.5 | 10.5 | 10.5 | 10.5 | 10.5 | 10.5 | 10.5 | 10.5 |
| Cover | Cover composition No. | B | B | B | B | B | A | C | D |
| | 10% modulus Mc (kgf/cm$^2$) | 11 | 11 | 11 | 11 | 11 | 8.7 | 18 | 55 |
| | Thickness Tc (mm) | 0.3 | 0.3 | 0.3 | 0.3 | 0.3 | 0.3 | 0.3 | 0.3 |
| | Volume ratio Vc (vol %) | 4.2 | 4.2 | 4.2 | 4.2 | 4.2 | 4.2 | 4.2 | 4.2 |
| Paint | Base agent Urethane polyol No. | 3 | 3 | 3 | 3 | 3 | 3 | 3 | 3 |
| | Number average molecular weight of PTMG | 1000 | 1000 | 1000 | 1000 | 1000 | 1000 | 1000 | 1000 |
| | Curing agent/Base agent (NCO/OH molar ratio) | 0.85 | 0.85 | 0.85 | 0.85 | 0.85 | 0.85 | 0.85 | 0.85 |
| Paint film | 10% modulus Mp (kgf/cm$^2$) | 50 | 50 | 50 | 50 | 50 | 50 | 50 | 50 |
| | Thickness Tp (mm) | 0.02 | 0.02 | 0.02 | 0.02 | 0.02 | 0.02 | 0.02 | 0.02 |
| | 200 × [NCO/OH] − 75 | 95 | 95 | 95 | 95 | 95 | 95 | 95 | 95 |
| Absolute value of difference (\|Mp − Mc\|) (kgf/cm$^2$) | | 39 | 39 | 39 | 39 | 39 | 41 | 32 | 5 |
| Difference (Mm − Mc) (kgf/cm$^2$) | | 191 | 216 | 297 | 165 | 97 | 193 | 184 | 147 |
| Difference (Mm − Me) (kgf/cm$^2$) | | 94 | 119 | 200 | 68 | 0 | 94 | 94 | 94 |
| Difference (Me − Mc) (kgf/cm$^2$) | | 97 | 97 | 97 | 97 | 97 | 99 | 90 | 53 |
| (Tm × Mm)/(Tc × Mc) | | 61.2 | 68.8 | 93.3 | 53.3 | 32.7 | 77.4 | 37.4 | 12.2 |
| (Tm × Mm)/(Te × Me) | | 2.3 | 2.6 | 3.6 | 2.0 | 1.3 | 2.3 | 2.3 | 2.3 |
| (Te × Me)/(Tc × Mc) | | 26.2 | 26.2 | 26.2 | 26.2 | 26.2 | 33.1 | 16.0 | 5.2 |
| (Tc × Mc)/(Tp × Mp) | | 3.30 | 3.3 | 3.3 | 3.3 | 3.3 | 2.6 | 5.4 | 16.5 |
| Evaluation | Compression deformation amount (mm) | 2.4 | 2.3 | 2.3 | 2.4 | 2.5 | 2.4 | 2.4 | 2.4 |
| | Coefficient of restitution | 100 | 102 | 104 | 99 | 98 | 100 | 100 | 100 |
| | Driver shots: spin rate (rpm) | 2650 | 2600 | 2550 | 2700 | 2750 | 2750 | 2600 | 2500 |
| | Driver shots: flight distance (m) | 252 | 254 | 256 | 251 | 247 | 250 | 253 | 255 |
| | Approach shots: spin rate (rpm) | 3650 | 3600 | 3550 | 3650 | 3700 | 3800 | 3600 | 3350 |
| | Shot feeling | G | G | G | G | G | E | G | P |
| | Stain resistance | G | G | G | G | G | G | G | G |

TABLE 9

| | Golf ball No. | 34 | 35 | 36 | 37 | 38 | 39 | 40 | 41 |
|---|---|---|---|---|---|---|---|---|---|
| Core | No. | VII | V | VI | VIII | IX | V | V | V |
| | Diameter (mm) | 37.5 | 38.5 | 38.5 | 38.1 | 38.5 | 38.5 | 38.5 | 38.5 |
| | Center hardness (JIS-C) | 55 | 55 | 55 | 55 | 55 | 55 | 55 | 55 |
| | Surface hardness (JIS-C) | 90 | 86 | 85 | 86 | 83 | 86 | 86 | 86 |
| | Hardness difference (JIS-C) | 35 | 31 | 30 | 31 | 28 | 31 | 31 | 31 |
| Intermediate layer | Intermediate layer composition No. | a | a | e | a | a | a | a | a |
| | 10% modulus Mm (kgf/cm$^2$) | 202 | 202 | 108 | 202 | 202 | 202 | 202 | 202 |
| | Thickness Tm (mm) | 0.8 | 0.8 | 1.0 | 1.0 | 1.0 | 1.0 | 1.0 | 1.0 |
| | Volume ratio Vm (vol %) | 9.0 | 9.5 | 12.0 | 11.8 | 12.0 | 12.0 | 12.0 | 12.0 |
| Envelope layer | Intermediate layer composition No. | e | e | a | e | e | e | e | e |
| | 10% modulus Me (kgf/cm$^2$) | 108 | 108 | 202 | 108 | 108 | 108 | 108 | 108 |
| | Thickness Te (mm) | 0.8 | 1.0 | 0.8 | 0.8 | 0.8 | 0.8 | 0.8 | 0.8 |
| | Volume ratio Ve (vol %) | 9.8 | 13.0 | 10.5 | 10.3 | 10.5 | 10.5 | 10.5 | 10.5 |
| Cover | Cover composition No. | B | B | B | B | B | B | B | B |
| | 10% modulus Mc (kgf/cm$^2$) | 11 | 11 | 11 | 11 | 11 | 11 | 11 | 11 |
| | Thickness Tc (mm) | 1.0 | 0.3 | 0.3 | 0.5 | 0.3 | 0.3 | 0.3 | 0.3 |
| | Volume ratio Vc (vol %) | 13.4 | 4.2 | 4.2 | 6.9 | 4.2 | 4.2 | 4.2 | 4.2 |
| Paint | Base agent Urethane polyol No. | 3 | 3 | 3 | 3 | 3 | 3 | 3 | 3 |
| | Number average molecular weight of PTMG | 1000 | 1000 | 1000 | 1000 | 1000 | 1000 | 1000 | 1000 |
| | Curing agent/Base agent (NCO/OH molar ratio) | 0.85 | 0.85 | 0.85 | 0.85 | 0.85 | 1.23 | 1.39 | 0.80 |
| Paint film | 10% modulus Mp (kgf/cm$^2$) | 50 | 50 | 50 | 50 | 50 | 100 | 122 | 44 |
| | Thickness Tp (mm) | 0.02 | 0.02 | 0.02 | 0.02 | 0.02 | 0.02 | 0.02 | 0.02 |
| | 200 × [NCO/OH] − 75 | 95 | 95 | 95 | 95 | 95 | 171 | 203 | 85 |
| Absolute value of difference (\|Mp − Mc\|) (kgf/cm$^2$) | | 39 | 39 | 39 | 39 | 39 | 89 | 111 | 33 |
| Difference (Mm − Mc) (kgf/cm$^2$) | | 191 | 191 | 97 | 191 | 191 | 191 | 191 | 191 |
| Difference (Mm − Me) (kgf/cm$^2$) | | 94 | 94 | −94 | 94 | 94 | 94 | 94 | 94 |
| Difference (Me − Mc) (kgf/cm$^2$) | | 97 | 97 | 191 | 97 | 97 | 97 | 97 | 97 |
| (Tm × Mm)/(Tc × Mc) | | 14.7 | 49.0 | 32.7 | 36.7 | 61.2 | 61.2 | 61.2 | 61.2 |
| (Tm × Mm)/(Te × Me) | | 1.9 | 1.5 | 0.7 | 2.3 | 2.3 | 2.3 | 2.3 | 2.3 |

TABLE 9-continued

| | Golf ball No. | 34 | 35 | 36 | 37 | 38 | 39 | 40 | 41 |
|---|---|---|---|---|---|---|---|---|---|
| (Te × Me)/(Tc × Mc) | | 7.9 | 32.7 | 49.0 | 15.7 | 26.2 | 26.2 | 26.2 | 26.2 |
| (Tc × Mc)/(Tp × Mp) | | 11.0 | 3.3 | 3.3 | 5.5 | 3.3 | 1.7 | 1.4 | 3.8 |
| Evaluation | Compression deformation amount (mm) | 2.4 | 2.5 | 2.4 | 2.4 | 2.4 | 2.4 | 2.4 | 2.4 |
| | Coefficient of restitution | 96 | 98 | 99 | 99 | 100 | 100 | 100 | 100 |
| | Driver shots: spin rate (rpm) | 2950 | 2800 | 2300 | 2750 | 2750 | 2650 | 2650 | 2650 |
| | Driver shots: flight distance (m) | 240 | 246 | 257 | 249 | 250 | 252 | 252 | 252 |
| | Approach shots: spin rate (rpm) | 4000 | 3750 | 3000 | 3800 | 3650 | 3450 | 3400 | 3680 |
| | Shot feeling | E | G | P | E | G | P | P | E |
| | Stain resistance | G | G | G | G | G | G | G | G |

TABLE 10

| | Golf ball No. | 42 | 43 | 44 | 45 | 46 | 47 | 48 | 49 |
|---|---|---|---|---|---|---|---|---|---|
| Core | No. | V | V | V | V | V | V | V | V |
| | Diameter (mm) | 38.5 | 38.5 | 38.5 | 38.5 | 38.5 | 38.5 | 38.5 | 38.5 |
| | Center hardness (JIS-C) | 55 | 55 | 55 | 55 | 55 | 55 | 55 | 55 |
| | Surface hardness (JIS-C) | 86 | 86 | 86 | 86 | 86 | 86 | 86 | 86 |
| | Hardness difference (JIS-C) | 31 | 31 | 31 | 31 | 31 | 31 | 31 | 31 |
| Intermediate layer | Intermediate layer composition No. | a | a | a | a | a | b | b | g |
| | 10% modulus Mm (kgf/cm$^2$) | 202 | 202 | 202 | 202 | 202 | 227 | 227 | 148 |
| | Thickness Tm (mm) | 1.0 | 1.0 | 1.0 | 1.0 | 1.0 | 1.0 | 1.0 | 0.8 |
| | Volume ratio Vm (vol %) | 12.0 | 12.0 | 12.0 | 12.0 | 12.0 | 12.0 | 12.0 | 9.5 |
| Envelope layer | Intermediate layer composition No. | e | e | e | e | e | g | h | i |
| | 10% modulus Me (kgf/cm$^2$) | 108 | 108 | 108 | 108 | 108 | 165 | 148 | 80 |
| | Thickness Te (mm) | 0.8 | 0.8 | 0.8 | 0.8 | 0.8 | 0.8 | 0.8 | 0.8 |
| | Volume ratio Ve (vol %) | 10.5 | 10.5 | 10.5 | 10.5 | 10.5 | 10.5 | 10.5 | 10.3 |
| Cover | Cover composition No. | B | B | B | B | B | B | B | B |
| | 10% modulus Mc (kgf/cm$^2$) | 11 | 11 | 11 | 11 | 11 | 11 | 11 | 11 |
| | Thickness Tc (mm) | 0.3 | 0.3 | 0.3 | 0.3 | 0.3 | 0.3 | 0.3 | 0.5 |
| | Volume ratio Vc (vol %) | 4.2 | 4.2 | 4.2 | 4.2 | 4.2 | 4.2 | 4.2 | 6.9 |
| Paint | Base agent Urethane polyol No. | 4 | 1 | 2 | 4 | 5 | 3 | 3 | 3 |
| | Number average molecular weight of PTMG | 1500 | 650 | 800 | 1500 | 2000 | 1000 | 1000 | 1000 |
| | Curing agent/Base agent (NCO/OH molar ratio) | 0.80 | 0.54 | 0.68 | 1.06 | 1.64 | 0.85 | 0.85 | 0.85 |
| Paint film | 10% modulus Mp (kgf/cm$^2$) | 29 | 50 | 50 | 50 | 50 | 50 | 50 | 50 |
| | Thickness Tp (mm) | 0.02 | 0.02 | 0.02 | 0.02 | 0.02 | 0.02 | 0.02 | 0.02 |
| | 200 × [NCO/OH] − 75 | 85 | 33 | 61 | 137 | 253 | 95 | 95 | 95 |
| Absolute value of difference (\|Mp − Mc\|) (kgf/cm$^2$) | | 18 | 39 | 39 | 39 | 39 | 39 | 39 | 39 |
| Difference (Mm − Mc) (kgf/cm$^2$) | | 191 | 191 | 191 | 191 | 191 | 216 | 216 | 137 |
| Difference (Mm − Me) (kgf/cm$^2$) | | 94 | 94 | 94 | 94 | 94 | 62 | 79 | 68 |
| Difference (Me − Mc) (kgf/cm$^2$) | | 97 | 97 | 97 | 97 | 97 | 154 | 137 | 69 |
| (Tm × Mm)/(Tc × Mc) | | 61.2 | 61.2 | 61.2 | 61.2 | 61.2 | 68.8 | 68.8 | 21.5 |
| (Tm × Mm)/(Te × Me) | | 2.3 | 2.3 | 2.3 | 2.3 | 2.3 | 1.7 | 1.9 | 1.9 |
| (Te × Me)/(Tc × Mc) | | 26.2 | 26.2 | 26.2 | 26.2 | 26.2 | 40.0 | 35.9 | 11.6 |
| (Tc × Mc)/(Tp × Mp) | | 5.7 | 3.3 | 3.3 | 3.3 | 3.3 | 3.3 | 3.3 | 5.5 |
| Evaluation | Compression deformation amount (mm) | 2.4 | 2.4 | 2.4 | 2.4 | 2.4 | 2.3 | 2.3 | 2.4 |
| | Coefficient of restitution | 100 | 100 | 100 | 100 | 100 | 103 | 102 | 99 |
| | Driver shots: spin rate (rpm) | 2650 | 2650 | 2650 | 2650 | 2650 | 2400 | 2500 | 2750 |
| | Driver shots: flight distance (m) | 252 | 252 | 252 | 252 | 252 | 258 | 256 | 249 |
| | Approach shots: spin rate (rpm) | 3720 | 3600 | 3630 | 3670 | 3690 | 3350 | 3500 | 3850 |
| | Shot feeling | E | G | G | G | G | P | G | E |
| | Stain resistance | G | VP | G | E | E | G | G | G |

TABLE 11

| | Golf ball No. | 50 | 51 | 52 | 53 | 54 | 55 | 56 |
|---|---|---|---|---|---|---|---|---|
| Core | No. | V | V | V | V | VIII | VIII | V |
| | Diameter (mm) | 38.5 | 38.5 | 38.5 | 38.5 | 38.1 | 38.1 | 38.5 |
| | Center hardness (JIS-C) | 55 | 55 | 55 | 55 | 55 | 55 | 55 |
| | Surface hardness (JIS-C) | 86 | 86 | 86 | 86 | 86 | 86 | 86 |
| | Hardness difference (JIS-C) | 31 | 31 | 31 | 31 | 31 | 31 | 31 |
| Intermediate layer | Intermediate layer composition No. | a | a | a | a | c | a | a |
| | 10% modulus Mm (kgf/cm$^2$) | 202 | 202 | 202 | 202 | 308 | 202 | 202 |
| | Thickness Tm (mm) | 1.0 | 1.0 | 1.0 | 1.0 | 0.8 | 1.0 | 1.0 |
| | Volume ratio Vm (vol %) | 12.0 | 12.0 | 12.0 | 12.0 | 9.3 | 11.8 | 12.0 |
| Envelope | Intermediate layer composition No. | e | j | j | e | k | e | e |

TABLE 11-continued

| Golf ball No. | | 50 | 51 | 52 | 53 | 54 | 55 | 56 |
|---|---|---|---|---|---|---|---|---|
| layer | 10% modulus Me (kgf/cm$^2$) | 108 | 135 | 135 | 108 | 129 | 108 | 108 |
| | Thickness Te (mm) | 0.8 | 0.8 | 0.8 | 0.8 | 1.0 | 0.8 | 0.9 |
| | Volume ratio Ve (vol %) | 10.5 | 10.5 | 10.5 | 10.5 | 12.8 | 10.3 | 11.9 |
| Cover | Cover composition No. | H | G | F | G | I | B | A |
| | 10% modulus Mc (kgf/cm$^2$) | 35 | 38 | 45 | 38 | 32 | 11 | 8.7 |
| | Thickness Tc (mm) | 0.3 | 0.3 | 0.3 | 0.3 | 0.5 | 0.5 | 0.2 |
| | Volume ratio Vc (vol %) | 4.2 | 4.2 | 4.2 | 4.2 | 6.9 | 6.9 | 2.8 |
| Paint | Base agent Urethane polyol No. | 3 | 3 | 3 | 3 | 3 | 3 | 3 |
| | Number average molecular weight of PTMG | 1000 | 1000 | 1000 | 1000 | 1000 | 1000 | 1000 |
| | Curing agent/Base agent (NCO/OH molar ratio) | 0.85 | 0.85 | 0.85 | 0.85 | 0.85 | 1.23 | 0.85 |
| Paint film | 10% modulus Mp (kgf/cm$^2$) | 50 | 50 | 50 | 50 | 50 | 100 | 50 |
| | Thickness Tp (mm) | 0.02 | 0.02 | 0.02 | 0.02 | 0.02 | 0.02 | 0.02 |
| | 200 × [NCO/OH] − 75 | 95 | 95 | 95 | 95 | 95 | 171 | 95 |
| Absolute value of difference (|Mp − Mc|) (kgf/cm$^2$) | | 15 | 12 | 5 | 12 | 18 | 89 | 41 |
| Difference (Mm − Mc) (kgf/cm$^2$) | | 167 | 164 | 157 | 164 | 276 | 191 | 193 |
| Difference (Mm − Me) (kgf/cm$^2$) | | 94 | 67 | 67 | 94 | 179 | 94 | 94 |
| Difference (Me − Mc) (kgf/cm$^2$) | | 73 | 97 | 90 | 70 | 97 | 97 | 99 |
| (Tm × Mm)/(Tc × Mc) | | 19.2 | 17.7 | 15.0 | 17.7 | 15.4 | 36.7 | 116.1 |
| (Tm × Mm)/(Te × Me) | | 2.3 | 1.9 | 1.9 | 2.3 | 1.9 | 2.3 | 2.1 |
| (Te × Me)/(Tc × Mc) | | 8.2 | 9.5 | 8.0 | 7.6 | 8.1 | 15.7 | 55.9 |
| (Tc × Mc)/(Tp × Mp) | | 10.5 | 11.4 | 13.5 | 11.4 | 16.0 | 2.8 | 1.7 |
| Evaluation | Compression deformation amount (mm) | 2.4 | 2.4 | 2.4 | 2.4 | 2.3 | 2.4 | 2.4 |
| | Coefficient of restitution | 100 | 100 | 100 | 100 | 104 | 100 | 100 |
| | Driver shots: spin rate (rpm) | 2550 | 2500 | 2450 | 2500 | 2550 | 2750 | 2500 |
| | Driver shots: flight distance (m) | 254 | 255 | 256 | 255 | 256 | 250 | 255 |
| | Approach shots: spin rate (rpm) | 3550 | 3500 | 3450 | 3450 | 3550 | 3600 | 3400 |
| | Shot feeling | G | G | P | P | G | E | P |
| | Stain resistance | G | G | G | G | G | G | G |

The golf ball No. 5 is the case where the difference (Mm−Mc) is lower than 100, thus the flight distance thereof on driver shots is low. The golf balls No. 8, No. 22 and No. 23 are the cases where the ratio (Tm×Mm)/(Tc×Mc) is lower than 7.5, thus the spin rate thereof on approach shots is low, and the shot feeling thereof is bad. The golf ball No. 9 is the case where the intermediate layer is thinner than the cover (Tm<Tc), thus the flight distance thereof on driver shots is low. The golf balls No. 12, No. 24 and No. 25 are the cases where the 10% modulus of the paint film is more than 100 kgf/cm$^2$, and the ratio (Tc×Mc)/(Tp×Mp) is lower than 2.4, thus the spin rate thereof on approach shots is low, and the shot feeling thereof is bad. The golf ball No. 15 is the case where the polyether diol with a number average molecular weight of 650 was used and the requirement of Mp≤200×X−75 is not satisfied, thus stain resistance thereof is bad.

The golf ball No. 30 is the case where Mm is equal to Me, thus the flight distance thereof on driver shots is low. The golf ball No. 33 is the case where the difference (Me−Mc) is lower than 55, thus the spin rate thereof on approach shots is low, and the shot feeling thereof is bad. The golf ball No. 34 is the case where the cover is thicker than the envelope layer (Te<Tc) and the ratio (Te×Me)/(Tc×Mc) is lower than 8.0, thus the flight distance thereof on driver shots is low. The golf ball No. 35 is the case where the envelope layer is thicker than the intermediate layer (Tm<Te) and the ratio (Tm×Mm)/(Te×Me) is lower than 1.8, thus the flight distance thereof on driver shots is low. The golf ball No. 36 is the case where the difference (Mm−Me) is lower than 50, thus the spin rate thereof on approach shots is low, and the shot feeling thereof is bad. The golf balls No. 39 and No. 56 are the cases where the ratio (Tc×Mc)/(Tp×Mp) is lower than 2.4, thus the spin rate thereof on approach shots is low. The golf ball No. 40 is the case where the 10% modulus of the paint film is more than 100 kgf/cm$^2$, and the ratio (Tc×Mc)/(Tp×Mp) is lower than 2.4, thus the spin rate thereof on approach shots is low, and the shot feeling thereof is bad. The golf ball No. 43 is the case where the polyether diol with a number average molecular weight of 650 was used and the requirement of Mp≤200×X−75 is not satisfied, thus stain resistance thereof is bad. The golf ball No. 47 is the case where the ratio (Tm×Mm)/(Te×Me) is lower than 1.8, thus the spin rate thereof on approach shots is low. The golf balls No. 52 and No. 53 are the cases where the ratio (Te×Me)/(Tc×Mc) is equal to or lower than 8.0, thus the shot feeling thereof is bad.

The present invention is useful for a painted golf ball. This application is based on Japanese Patent applications No. 2014-074634 filed on Mar. 31, 2014 and No. 2014-074635 filed on Mar. 31, 2014, the contents of which are hereby incorporated by reference.

The invention claimed is:

1. A golf ball comprising a golf ball body having a spherical core, an intermediate layer covering the spherical core and a cover covering the intermediate layer, and a paint film formed on a surface of the golf ball body,
   wherein a 10% modulus Mp (kgf/cm$^2$) of the paint film is 5 kgf/cm$^2$ or more and 100 kgf/cm$^2$ or less,
   a 10% modulus Mm (kgf/cm$^2$) of the intermediate layer is 120 kgf/cm$^2$ or more and 400 kgf/cm$^2$ or less,
   a 10% modulus Mc (kgf/cm$^2$) of the cover is 3 kgf/cm$^2$ or more and 20 kgf/cm$^2$ or less,
   a thickness Tp (mm) of the paint film is 0.005 mm or more and 0.05 mm or less,
   a thickness Tm (mm) of the intermediate layer is 0.7 mm or more and 1.6 mm or less,
   a thickness Tc (mm) of the cover is 0.3 mm or more and 0.8 mm or less, a base resin constituting the paint film is a polyurethane obtained by a reaction between a polyol composition and a polyisocyanate composition, the polyol composition contains a urethane polyol including a polyether diol with a number average molecular weight ranging from 800 to 3000 as a constituent component, a molar ratio (NCO/OH) X of an isocyanate group (NCO) in the polyisocyanate composition to a hydroxyl group (OH) in the polyol composition is more than 0.5 and 1.20 or less, and the 10% modulus Mp (kgf/cm$^2$) of the paint film, the 10% modulus Mm (kgf/cm$^2$) of the intermediate layer, the 10% modulus Mc (kgf/cm$^2$) of the cover, the thickness Tp (mm) of the paint film, the thickness Tm (mm) of the intermediate layer, the thickness Tc (mm) of the cover, and the molar ratio (NCO/OH) further satisfy following requirements;

$Mp \leq 200 \times X - 75$ $Mm - Mc > 100$ $Tm > Tc > Tp$ $(Tm \times Mm)/(Tc \times Mc) > 7.5$ $(Tc \times Mc)/(Tp \times Mp) > 2.4$.

2. The golf ball according to claim 1, further comprises an envelope layer disposed between the intermediate layer and the cover, wherein the 10% modulus Mm (kgf/cm$^2$) of the intermediate layer, a 10% modulus Me (kgf/cm$^2$) of the envelope layer, the 10% modulus Mc (kgf/cm$^2$) of the cover, the thickness Tp (mm) of the paint film, the thickness Tm (mm) of the intermediate layer, a thickness Te (mm) of the envelope layer, and the thickness Tc (mm) of the cover satisfy following requirements;

$Mm - Me > 50$ $Me - Mc > 55$ $Tm \geq Te > Tc > Tp$ $(Tm \times Mm)/(Te \times Me) > 1.8$ $(Te \times Me)/(Tc \times Mc) > 8.0$.

3. The golf ball according to claim 1, wherein an absolute value (|Mp−Mc|) of a difference between the 10% modulus Mp (kgf/cm$^2$) of the paint film and the 10% modulus Mc (kgf/cm$^2$) of the cover is 65 kgf/cm$^2$ or less.

4. The golf ball according to claim 1, wherein a ratio of a volume Vc of the cover to a volume of the golf ball body is less than 10 vol %.

5. The golf ball according to claim 1, wherein the spherical core has a hardness difference (Hs−Ho) between a surface hardness Hs and a center hardness Ho thereof of 20 or more in JIS-C hardness.

6. The golf ball according to claim 1, wherein the spherical core comprises at least one layer formed from a rubber composition containing a fatty acid and/or a metal salt thereof.

7. The golf ball according to claim 1, wherein the spherical core is a two layered core consisting of a spherical inner core and an outer core covering the inner core.

8. The golf ball according to claim 1, wherein a ratio of a volume Vm of the intermediate layer to a volume of the golf ball body ranges from 8 vol % to 20 vol %.

9. The golf ball according to claim 2, wherein a ratio of a volume Vm of the intermediate layer to a volume of the golf ball body ranges from 7.0 vol % to 18.0 vol %.

10. The golf ball according to claim 2, wherein a ratio of a volume Ve of the envelope layer to a volume of the golf ball body ranges from 6.0 vol % to 15.0 vol %.

11. The golf ball according to claim 1, wherein the value (Tp×Mp) obtained by multiplying the thickness Tp (mm) of the paint film and the 10% modulus Mp (kgf/cm$^2$) of the paint film ranges from 0.2 to 4.0, the value (Tm×Mm) obtained by multiplying the thickness Tm (mm) of the intermediate layer and the 10% modulus Mm (kgf/cm$^2$) of the intermediate layer ranges from 120 to 400, and the value (Tc×Mc) obtained by multiplying the thickness Tc (mm) of the cover and the 10% modulus Mc (kgf/cm$^2$) of the cover ranges from 2.0 to 26.0.

12. The golf ball according to claim 1, wherein a hardness Hm of the intermediate layer ranges from 62 to 75 in Shore D hardness, and a hardness Hc of the cover ranges from 20 to 38 in Shore D hardness.

13. The golf ball according to claim 1, wherein a weight average molecular weight of the urethane polyol ranges from 5000 to 20000.

14. The golf ball according to claim 1, wherein a hydroxyl value of the urethane polyol ranges from 10 mgKOH/g to 200 mgKOH/g.

15. The golf ball according to claim 1, wherein a content of the polyether diol having a number average molecular weight from 800 to 3000 in the urethane polyol is 70 mass % or more.

16. The golf ball according to claim 1, wherein a material of the intermediate layer includes at least one member selected from the group consisting of polyurethane resin, ionomer resin, polyamide resin, polyethylene, styrene elastomer, polyolefin elastomer, polyurethane elastomer, polyester elastomer, and a vulcanized product of a rubber composition.

17. The golf ball according to claim 1, wherein a cover material constituting the cover includes at least one member selected from the group consisting of an ionomer resin, polyurethane, polyamide, polyester, and polystyrene.

18. The golf ball according to claim 1, wherein an absolute value (|Mp−Mc|) of a difference between the 10% modulus Mp (kgf/cm$^2$) of the paint film and the 10% modulus Mc (kgf/cm$^2$) of the cover is 65 kgf/cm$^2$ or less, the value (Tp×Mp) obtained by multiplying the thickness Tp (mm) of the paint film and the 10% modulus Mp (kgf/cm$^2$) of the paint film ranges from 0.2 to 4.0, the value (Tm×Mm) obtained by multiplying the thickness Tm (mm) of the intermediate layer and the 10% modulus Mm (kgf/cm$^2$) of the intermediate layer ranges from 120 to 400, the value (Tc×Mc) obtained by multiplying the thickness Tc (mm) of the cover and the 10% modulus Mc (kgf/cm$^2$) of the cover ranges from 2.0 to 26.0, a hardness Hm of the intermediate layer ranges from 62 to 75 in Shore D hardness, and a hardness Hc of the cover ranges from 20 to 38 in Shore D hardness.

19. The golf ball according to claim 1, wherein the weight average molecular weight of the urethane polyol ranges from 5000 to 20000, a hydroxyl value of the urethane polyol ranges from 10 mgKOH/g to 200 mgKOH/g, and a content of the polyether diol having a number average molecular weight from 800 to 3000 in the urethane polyol is 70 mass % or more.

* * * * *